(12) United States Patent
Katase

(10) Patent No.: US 11,402,249 B2
(45) Date of Patent: Aug. 2, 2022

(54) FLOW RATE SENSOR DEVICE

(71) Applicant: KOA CORPORATION, Nagano (JP)

(72) Inventor: Yasuyuki Katase, Nagano (JP)

(73) Assignee: KOA CORPORATION, Nagano (JP)

( * ) Notice: Subject to any disclaimer, the term of this patent is extended or adjusted under 35 U.S.C. 154(b) by 0 days.

(21) Appl. No.: 17/275,468

(22) PCT Filed: Sep. 19, 2019

(86) PCT No.: PCT/JP2019/036826
§ 371 (c)(1),
(2) Date: Mar. 11, 2021

(87) PCT Pub. No.: WO2020/059821
PCT Pub. Date: Mar. 26, 2020

(65) Prior Publication Data
US 2022/0018696 A1    Jan. 20, 2022

(30) Foreign Application Priority Data
Sep. 21, 2018  (JP) .............................. JP2018-177993

(51) Int. Cl.
*G01F 1/69* (2006.01)
*G01F 1/698* (2006.01)

(52) U.S. Cl.
CPC ................ *G01F 1/69* (2013.01); *G01F 1/698* (2013.01)

(58) Field of Classification Search
CPC . G01F 1/69; G01F 1/698; G01F 1/696; G01F 15/068; G01P 1/026; G01P 5/12
See application file for complete search history.

(56) References Cited

U.S. PATENT DOCUMENTS

| | | | |
|---|---|---|---|
| 2007/0258216 A1* | 11/2007 | McBain | H05K 7/20254 361/707 |
| 2010/0170335 A1* | 7/2010 | Nakano | G01F 1/698 73/204.26 |

(Continued)

FOREIGN PATENT DOCUMENTS

| | | |
|---|---|---|
| JP | S6-092859 | 7/1981 |
| JP | 07-229914 | 8/1995 |

(Continued)

OTHER PUBLICATIONS

Official Communication issued in International Bureau of WIPO Patent Application No. PCT/JP2019/036826, dated Dec. 17, 2019.

(Continued)

*Primary Examiner* — Francis C Gray
(74) *Attorney, Agent, or Firm* — Greenblum & Bernstein, P.L.C.

(57) ABSTRACT

It is an object to provide a flow rate sensor device having improved sensor responsiveness compared with the prior art. The present invention is a flow rate sensor device including a sensor element that detects a flow rate, wherein a sensor unit on which the sensor element is mounted and a drive substrate including a drive control circuit are connected through a connection portion narrower than a width of the drive substrate. Thus, a heat source in the drive substrate and a heat source in the sensor unit can be separated by the connection portion that is thin in width, and the thermal influence from the drive substrate to the sensor unit can be suppressed. Therefore, good sensor responsiveness can be maintained.

6 Claims, 18 Drawing Sheets

(56) References Cited

U.S. PATENT DOCUMENTS

2014/0248621 A1* 9/2014 Collins .............. G01N 33/4833
                                                   435/6.12
2019/0170556 A1* 6/2019 Ikeno .................... G01F 15/022

FOREIGN PATENT DOCUMENTS

| JP | 08-035978 | 2/1996 |
| JP | 09-304142 | 11/1997 |
| JP | 2017-198496 | 11/2017 |
| WO | 1987/000917 | 2/1987 |

OTHER PUBLICATIONS

Japanese Office Action dated May 24, 2022 issued in Japanese patent application No. 2018-177993, along with corresponding English translation.

* cited by examiner

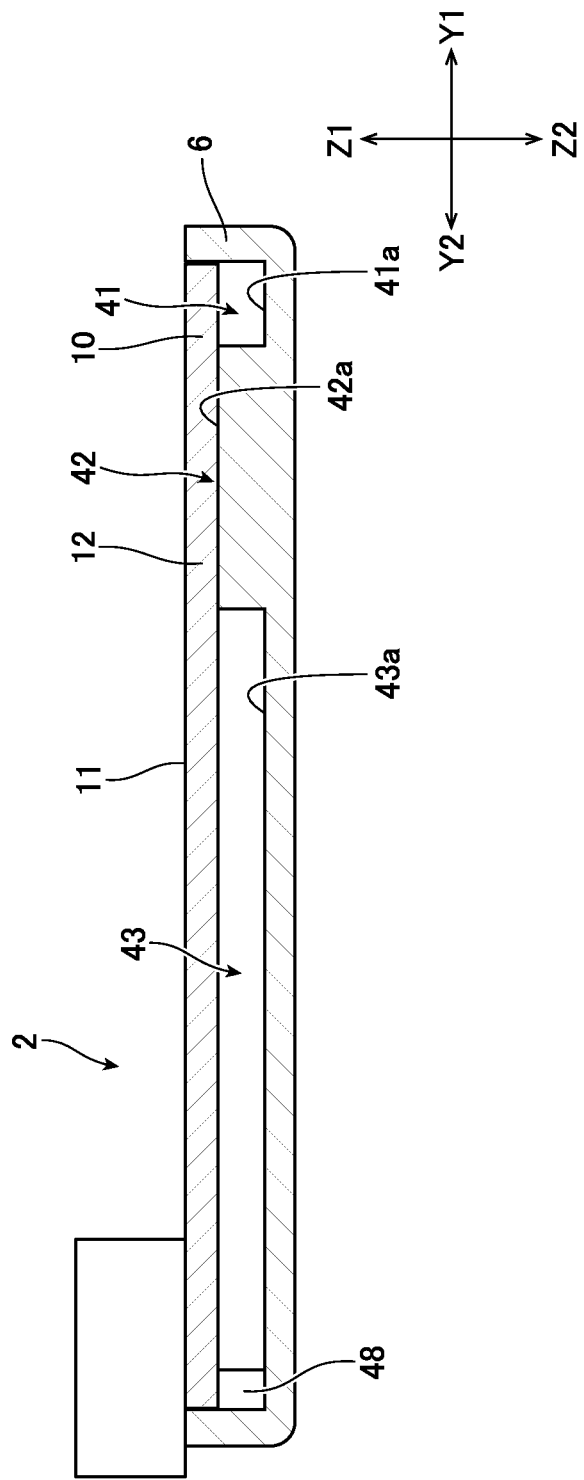

FLOW RATE SENSOR DEVICE

TECHNICAL FIELD

The present invention relates to a flow rate sensor device that detects a flow rate of a fluid.

BACKGROUND ART

According to Patent Literature 1, in addition to thermo-sensitive resistors $R_H$ and $R_T$, an operational amplifier, a transistor, and various kinds of resistors are disposed on a substrate.

CITATION LIST

Patent Literature

Patent Literature 1: Japanese Patent Laid-Open No. 8-35978

SUMMARY OF INVENTION

Technical Problem

According to Patent Literature 1, thermo-sensitive resistors and a drive control circuit including an operational amplifier and various kinds of resistors are disposed on one rectangular substrate. Thus, heat generated in a heat source in the drive control circuit affects the thermo-sensitive resistors, which disadvantageously reduces the sensor responsiveness.

Accordingly, an object of the present invention, which has been made in view of the problem, is to provide a flow rate sensor device having improved sensor responsiveness, compared with the prior art.

Solution to Problem

A flow rate sensor device according to one aspect of the present invention includes a sensor element that detects a flow rate. A sensor unit on which the sensor element is mounted and a drive substrate including a drive control circuit are connected through a connection portion narrower than a width of the drive substrate.

Advantageous Effect of Invention

With the flow rate sensor device of the present invention, a heat source in a drive substrate and a heat source in a senser unit are separated by a connection portion that is narrow in width, so that thermal influence from the drive substrate to the sensor unit can be suppressed and that good sensor responsiveness can be maintained.

BRIEF DESCRIPTION OF DRAWINGS

FIG. 10 is a partial section view of the flow rate sensor device shown in FIG. 4.

DESCRIPTION OF EMBODIMENTS

Figure 1:
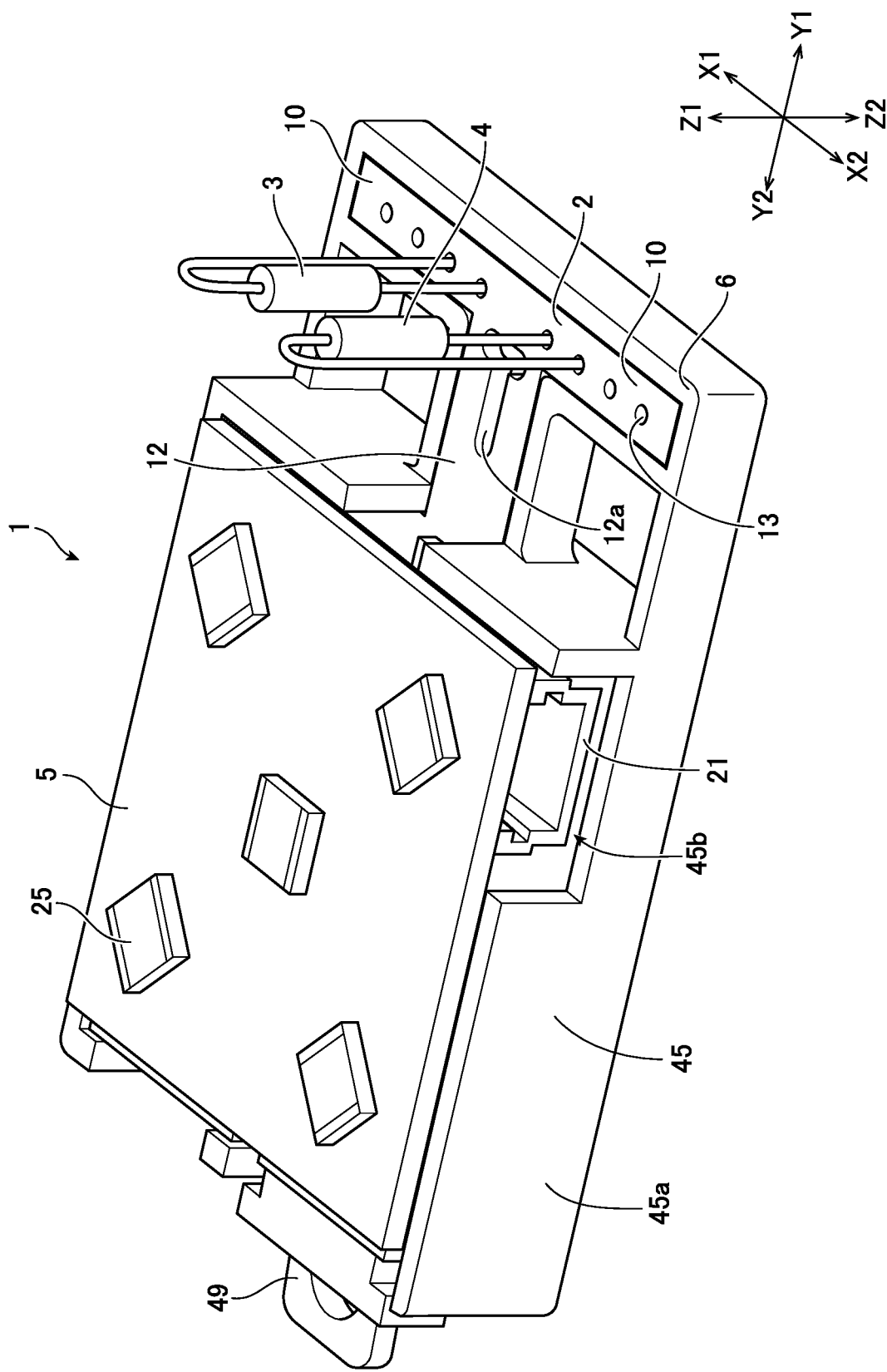
FIG. 1 is a perspective view of a flow rate sensor device according to a first embodiment.
Figure 2:
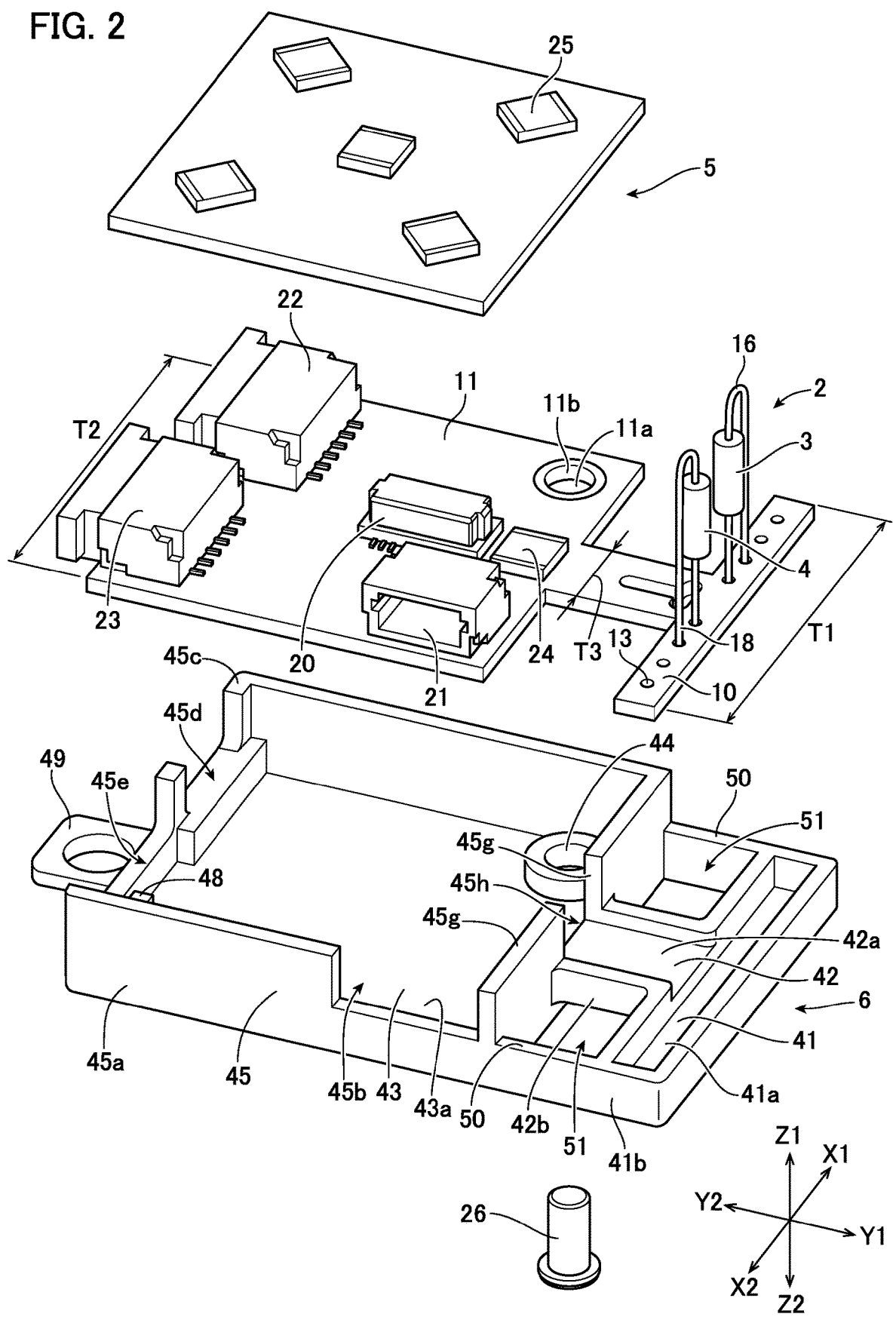
FIG. 2 is an exploded perspective view of the flow rate sensor device according to the first embodiment.
Figure 3:
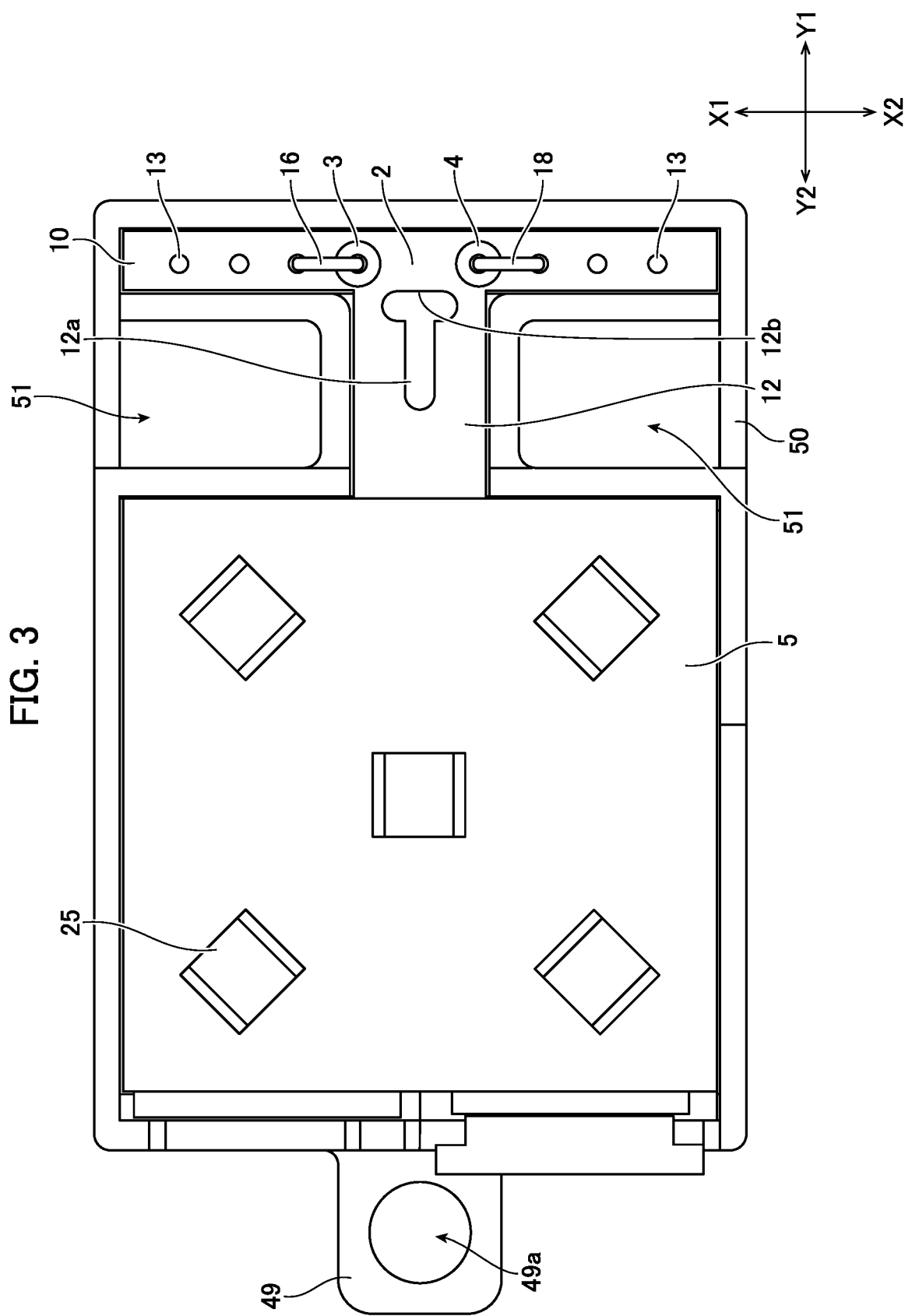
FIG. 3 is a plan view of the flow rate sensor device according to the first embodiment.
Figure 4:
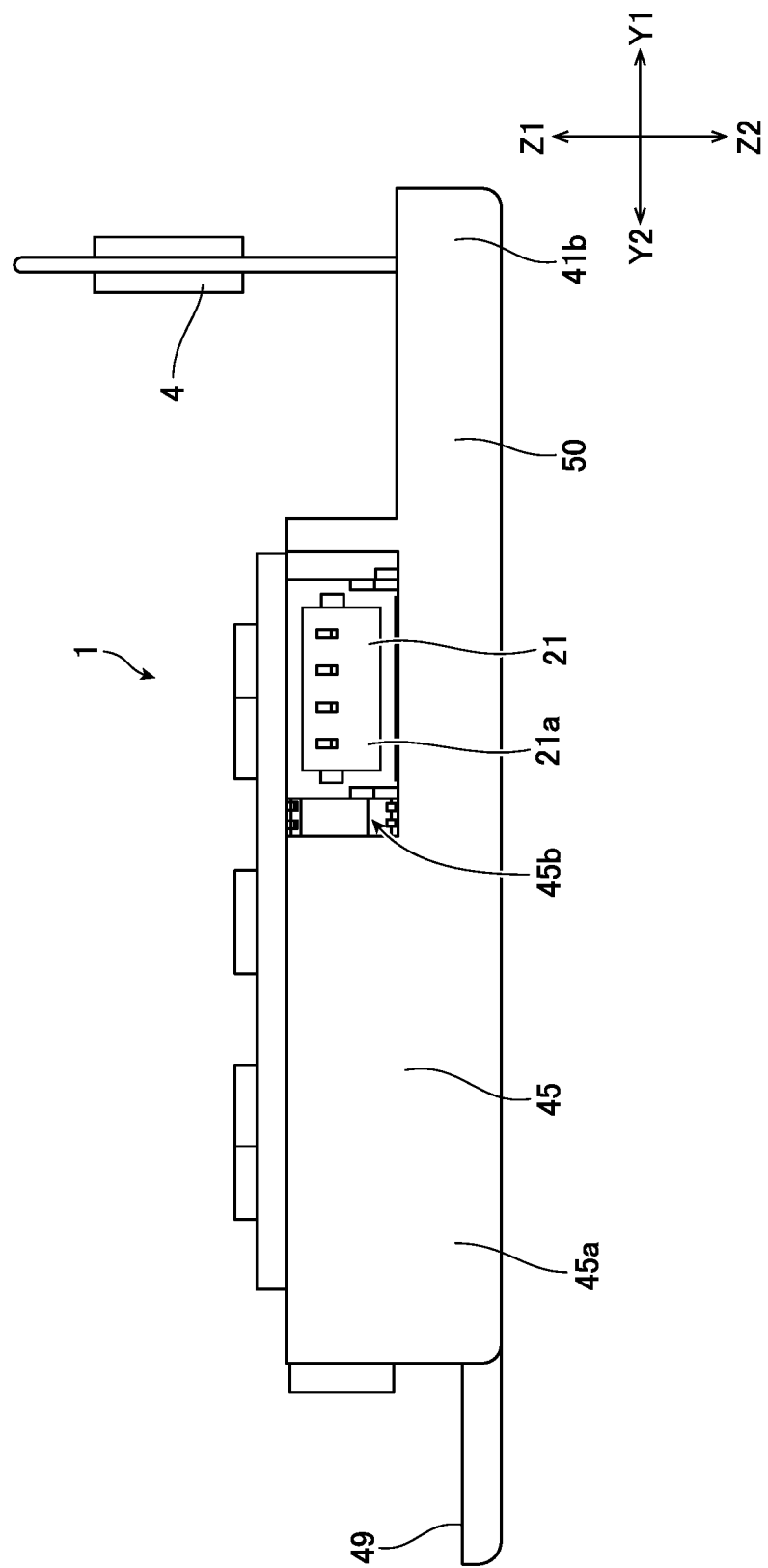
FIG. 4 is a side view of the flow rate sensor device according to the first embodiment.
Figure 5:
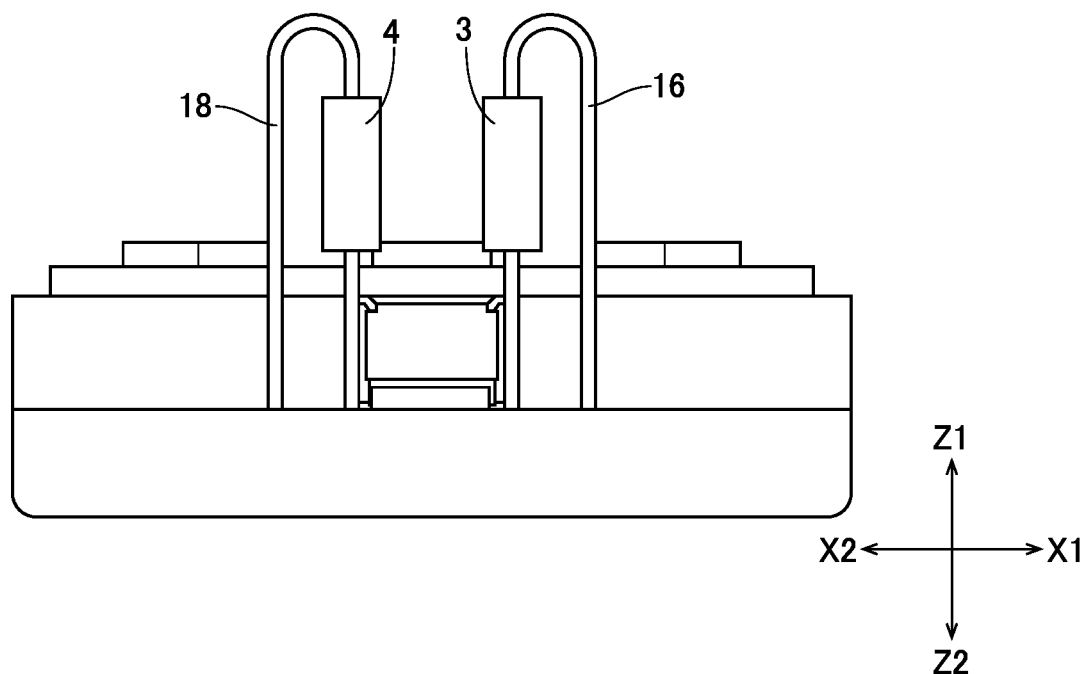
FIG. 5 is a front view of the flow rate sensor device according to the first embodiment.
Figure 6:
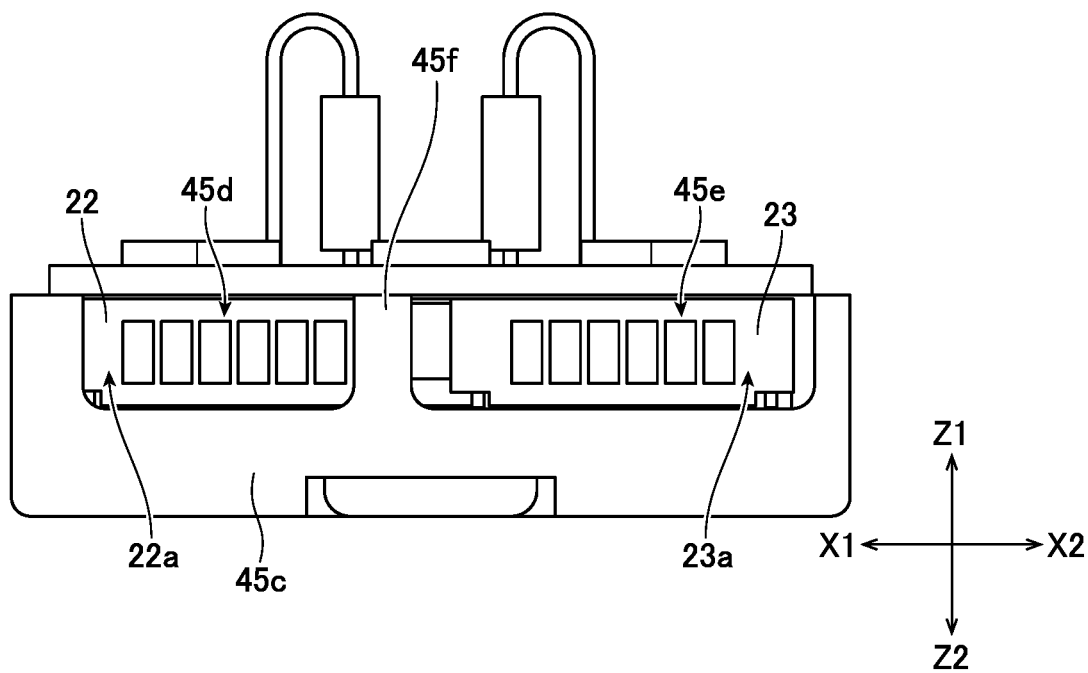
FIG. 6 is a rear view of the flow rate sensor device according to the first embodiment.

Flow rate sensor devices according to embodiments are described below with reference to attached drawings. FIG. 1 is a perspective view of a flow rate sensor device according to a first embodiment. FIG. 2 is an exploded perspective view of the flow rate sensor device according to the first embodiment. FIG. 3 is a plan view of the flow rate sensor device according to the first embodiment. FIG. 4 is a side view of the flow rate sensor device according to the first embodiment. FIG. 5 is a front view of the flow rate sensor device according to the first embodiment. FIG. 6 is a rear view of the flow rate sensor device according to the first embodiment. Hereinafter, an X1-X2 direction, a Y1-Y2 direction, and a Z1-Z2 direction are used. These are orthogonal to each other. The X1 direction and the X2 direction are referred to as "X direction" if no distinction is necessary. Note that the X direction is a direction of alignment of a plurality of terminal holes 13, which is described below (see FIG. 1, for example). The Y direction orthogonal to the X direction is a length direction, and the Y1 direction is a front direction, and the Y2 direction is a rear direction. The Y1 direction and the Y2 direction are referred to as "Y direction" if no distinction is necessary. Note that the Y direction is a direction of connection between a sensor unit 10 and a drive substrate 11 through a connection portion 12, which is described below (see FIG. 2, for example). The Z direction orthogonal to the X direction and the Y direction is a height direction of a flow rate sensor device 1 and a thickness direction of each substrate. The Z1 direction is a top direction, and the Z2 direction is a bottom direction. The Z1 direction and the Z2 direction are referred to as "Z direction"

if no distinction is necessary. Note that, although the subject of detection by the flow rate sensor device of this embodiment is not particularly limited if a change in flow rate can be detected, the following description assumes that sensor elements 3 and 4 are wind speed sensors.

<Overall Structure of Flow Rate Sensor Device 1 of First Embodiment>

As shown in FIG. 1 and FIG. 2, for example, the flow rate sensor device 1 according to the first embodiment includes a unit body 2 including the sensor elements 3 and 4, a light emission substrate (LED substrate) 5, and a case 6.

The sensor elements 3 and 4 can detect a change in wind speed and, based on the detection information, an LED 25 mounted on the LED substrate 5 is caused to emit light.

The unit body 2, the LED substrate 5, and the case 6 are sequentially described below.

<Unit Body 2>

Figure 8:
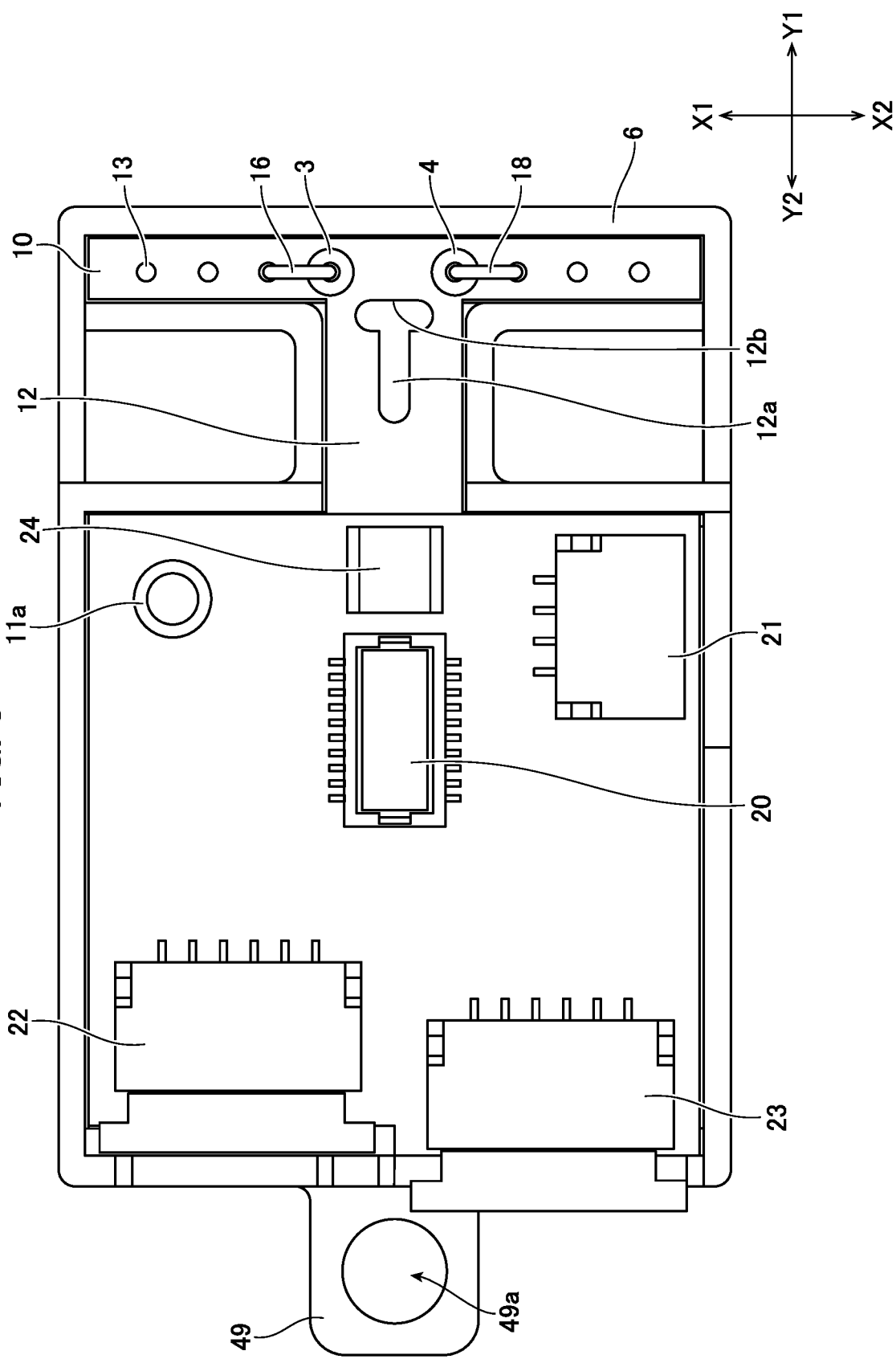
FIG. 8 is a plan view of the flow rate sensor device from which the LED substrate is removed.

As shown in FIG. 2 and FIG. 8, for example, the unit body 2 has the sensor unit 10 on which the sensor elements 3 and 4 are mounted, the drive substrate 11 including a drive control circuit, and the connection portion 12 that connects the sensor unit 10 and the drive substrate 11.

The unit body 2 is a structure having the sensor elements 3 and 4, connectors and circuit elements disposed on a substrate, which is a printed circuit board subjected to etching, wiring and shaping.

(Sensor Unit 10)

As shown in FIG. 2, the sensor unit 10 has, for example, a bar shape (elongated shape) extending long in the X direction. As shown in FIG. 1 to FIG. 3 and FIG. 8, the sensor unit 10 is provided with the plurality of terminal holes 13 provided with intervals therebetween in the X direction. The terminal holes 13 are provided at equal intervals. Also, the terminal holes 13 are provided through the sensor unit 10.

A metallic film (made of, for example, copper foil), not shown, is continuously provided on an outer circumferential front surface and outer circumferential back surface of each of the terminal holes 13 and an inner wall surface of each of the terminal holes 13. These metallic films are electrically connected to the drive control circuit on the drive substrate 11 via metallic wiring (not shown).

According to this embodiment shown in FIG. 1 to FIG. 3 and FIG. 8, the plurality of terminal holes 13 are arranged in a line along the X direction. According to this embodiment, the number of terminal holes 13 is higher than the number of terminals required for connection of the sensor elements 3 and 4 although the number of the terminal holes 13 is not limited.

As shown in FIG. 5, for example, the sensor element 3 has a resistance element for flow rate detection, which is described below, and is connected to a lead terminal (lead line) 16. The sensor element 4 has a resistance element for temperature compensation, which is described below, and is connected to a lead terminal (lead line) 18.

As shown in FIG. 5, for example, each of the lead terminals 16 and 18 is bent down to, for example, a U shape. As shown in FIG. 1 to FIG. 3 and FIG. 8, each of terminal tips of the lead terminals 16 and 18 is inserted into one of the terminal holes 13 of the sensor unit 10. The lead terminals 16 and 18 inserted into the terminal holes 13 are fixed to the sensor unit 10 by, for example, soldering. Thus, each of the sensor elements 3 and 4 is electrically connected to the drive control circuit.

According to this embodiment, the number of terminal holes 13 is higher than the total number of terminals required for the connection of the sensor elements 3 and 4. In other words, according to this embodiment shown in FIG. 1, for example, the total number of terminals required for the connection of the sensor elements 3 and 4 is four while the number of terminal holes 13 is eight. Therefore, the arrangement of the sensor elements 3 and 4 in the sensor unit 10 is not limited to one position but can be selected from a plurality of positions. In other words, the arrangement of the sensor elements 3 and 4 shown in FIG. 1, for example, is merely an example. For example, as shown in FIG. 3 and FIG. 8, for example, two terminal holes 13 are free on the X1 side of the sensor element 3. Therefore, the sensor element 3 may be fixed by inserting the lead terminal 16 connected to the sensor element 3 into the two terminal holes 13 at the end in the X1 direction, instead of the position shown in FIGS. 3 and 8, for example. Similarly, the sensor element 4 may be fixed by inserting the lead terminal 18 connected to the sensor element 4 shown in FIG. 3 and FIG. 8, for example, into the two terminal holes 13 at the end in the X2 direction. Alternatively, one sensor element may be arranged across an upper part of the other sensor element. In this way, according to this embodiment, a wide choice of options for arrangement of the sensor elements 3 and 4 can be provided.

Figure 11A:
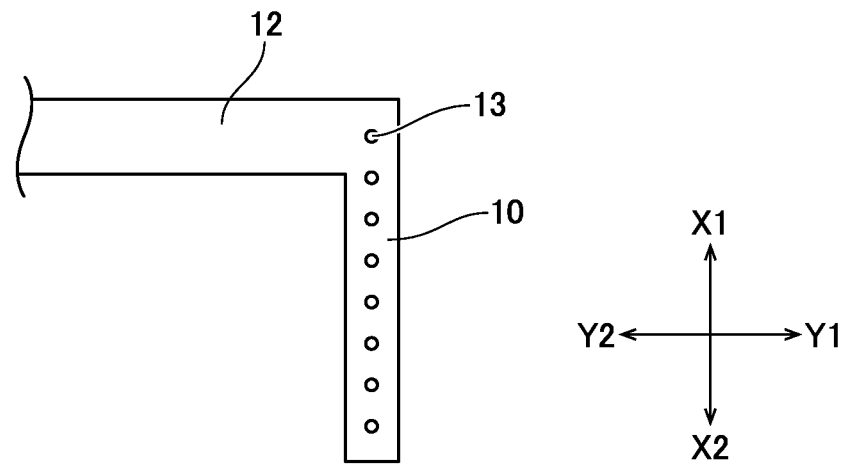
FIG. 11A is partially enlarged plan views showing a modification example of a shape of a sensor unit in the embodiment.

According to this embodiment shown in FIG. 1 to FIG. 3 and FIG. 8, the sensor unit 10 extends in both of the X1 direction and the X2 direction from an end of the connection portion 12 that extends in the Y1 direction. Combining the shapes of the connection portion 12 and the sensor unit 10, a substantial T shape is acquired. However, according to this embodiment, the shape is not limited to the substantial T shape. For example, as shown in FIG. 11A, the sensor unit 10 may extend from the end of the connection portion 12 to the X2 direction only. The length of the extension of the sensor unit 10 that extends from the end of the connection portion 12 to the X1 direction and the length of the extension of the sensor unit 10 that extends to the X2 direction may be different in FIG. 3, for example. In this regard, according to the embodiment in FIG. 3, for example, the length of the extension of the sensor unit 10 that extends to the X1 direction and the length of the extension of the sensor unit 10 that extends to the X2 direction are equal. Also, according to the embodiment shown in FIG. 3, for example, the connection portion 12 extends in the Y direction, and the sensor unit 10 extends in the X direction, and the connection portion 12 and the sensor unit 10 have an orthogonal relationship. However, according to this embodiment, their relationship is not limited to the orthogonal relationship, but the connection portion 12 and the sensor unit 10 may have a tilt other than the orthogonal relationship.

Figure 11B:
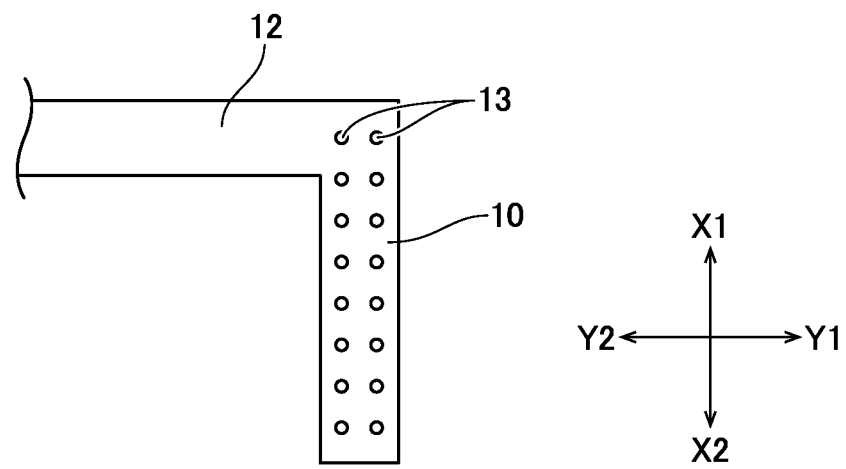
FIG. 11B is partially enlarged plan views showing a modification example of a shape of a sensor unit in the embodiment.

Although, according to this embodiment shown in FIG. 1 to FIG. 3 and FIG. 8, the plurality of terminal holes 13 of the sensor unit 10 are arranged in a line in the X direction, the plurality of terminal holes 13 may be arranged in a plurality of lines as shown in FIG. 11B. In FIG. 11B, the terminal holes 13 are arranged in two lines in the X direction at intervals in the Y direction. As shown in FIG. 11B, given the terminal holes 13 arranged in a plurality of lines, the sensor element 3 and the sensor element 4 can be arranged with an interval therebetween in the Y direction, for example. In the embodiment shown in FIG. 11B, the number of the terminal holes 13 is higher than those of the embodiments in FIG. 3 and FIG. 11A, which can thus provide a wide choice of options for the arrangement of the sensor elements 3 and 4.

As shown in FIG. 2, the sensor unit 10 has a width dimension (dimension to the X1 direction) T1. Although, in this embodiment, the width dimension T1 of the sensor unit 10 is equal to a width dimension T2 of the drive substrate 11, they may be different from each other. The connection portion 12 that connects the sensor unit 10 and the drive substrate 11 has a width dimension T3. The width dimension T3 of the connection portion 12 is smaller than the width dimension T1 of the sensor unit 10 and the width dimension T2 of the drive substrate 11. In this way, the connection portion 12 has a shape that is narrow in width.

(Drive Substrate 11)

The drive substrate 11 has the drive control circuit. The drive control circuit includes circuit elements (not shown) such as an active element, a passive element and a mechanism element. The drive control circuit is electrically connected to the sensor elements 3 and 4 mounted on the sensor unit 10 and performs predetermined signal processing based on a change in resistance of the resistance element for flow rate detection. The drive substrate 11 is electrically connected to the LED substrate 5, which is described below. Thus, the drive control circuit can perform signal processing on an LED mounted on the LED substrate 5.

As shown in FIG. 2 and FIG. 8, a substrate-to-substrate connector 20 to the LED substrate is provided at the substantially center in the X direction but a little closely to the sensor unit 10 (on the Y1 side) relative to the center of the Y direction on the drive substrate 11.

As shown in FIG. 2 and FIG. 8, on the drive substrate 11, a power supply connection connector 21, an upper side connection connector 22 and a lower side connection connector 23 are provided. As shown in FIG. 4, the power supply connection connector 21 is disposed on the drive substrate 11 such that an opening 21a of the power supply connection connector 21 can face a side of the flow rate sensor device 1.

The power supply connection connector 21 is a connector for single operation. In other words, when the flow rate sensor device 1 is used alone, the power supply connection connector 21 is used.

A plurality of the flow rate sensor devices 1 of this embodiment can be connected, for example, in series in a daisy chain configuration. In this case, the upper side connection connector 22 and the lower side connection connector 23 are used. The upper side connection connector 22 of one flow rate sensor device 1 and the lower side connection connector 23 of the other flow rate sensor device 1 are electrically connected via a communication cable (not shown).

As shown in FIG. 2 and FIG. 8, the upper side connection connector 22 and the lower side connection connector 23 are disposed at an end (called "rear end") on a side in the Y2 direction, which is away from the sensor unit 10, on the drive substrate 11. In this case, as shown in FIG. 6, the upper side connection connector 22 and the lower side connection connector 23 are disposed on the drive substrate 11 such that openings 22a and 23a of the upper side connection connector 22 and the lower side connection connector 23, respectively, can face the rear end of the flow rate sensor device 1.

As shown in FIG. 2 and FIG. 8, the upper side connection connector 22 and the lower side connection connector 23 are arranged at positions displaced to some extent in the Y direction. In this embodiment, the upper side connection connector 22 is arranged on the Y1 side to some extent relative to the lower side connection connector 23. Thus, the upper side connection connector 22 and the lower side connection connector 23 can be distinguished. In particular, since the upper side connection connector 22 and the lower side connection connector 23 cannot be distinguished when they have an identical connector shape, the distinguishability is preferably increased by displacing the connectors 22 and 23 in the front-rear direction or by using different colors for the connectors, like this embodiment.

The power supply connection connector 21, the upper side connection connector 22 and the lower side connection connector 23 are disposed on the side or at the rear end of the drive substrate 11 and have their openings directing to outside. Thus, through these connectors, heat generated in the drive substrate 11 can be diffused to outside of the flow rate sensor device 1. The power supply connection connector 21, the upper side connection connector 22 and the lower side connection connector 23 are arranged near the heat source so that the heat diffusion effect can be improved.

As shown in FIG. 2 and FIG. 8, an LED 24 is provided on the drive substrate 11. The LED 24 is a light emitting device that performs plane emission toward the Z1 direction. Although one LED 24 is disposed on the drive substrate 11 in FIG. 2 and FIG. 8, the number of the LED 24 is not limited thereto. Also, although the LED 24 is arranged at the substantial center in the X direction of the drive substrate 11 and more closely to the sensor unit 10 (Y1 side) than the substrate-to-substrate connector 20 in FIG. 2 and FIG. 8, the arranged position is not limited thereto.

According to this embodiment, the LED substrate 5 is detachable from the drive substrate 11, as is described below. Therefore, a configuration is possible in which the LED substrate 5 is not attached to the drive substrate 11. In this case, the LED 24 provided on the drive substrate 11 can be used.

However, in this embodiment, it is not essential to dispose the LED 24 on the drive substrate 11, and the LED 24 may not be disposed on the drive substrate 11.

As shown in FIG. 2 and FIG. 8, the drive substrate 11 has a through-hole 11a. The case 6, which is described below, also has a through-hole at a position opposed to the through-hole 11a. With the drive substrate 11 accommodated in the case 6, a fixing member 26 shown in FIG. 2 is inserted into the through-holes of the case 6 and the drive substrate 11. Thus, the drive substrate 11 and the case 6 can be fixed.

Also, as shown in FIG. 2, a ring-shaped metal part 11b containing, for example, copper foil is provided on a circumferential front surface of the through-hole 11a of the drive substrate 11. The metal part 11b is preferably provided also on a circumferential back surface of the through-hole 11a of the drive substrate 11. Also, the metal part 11b is preferably provided continuously also on an inner wall surface of the through-hole 11a. The provision of the metal part 11b facilitates diffusion of heat from a bottom surface of the case 6 to outside through the fixing member 26.

(Connection Portion 12)

As shown in FIG. 1 to FIG. 3 and FIG. 8, the connection portion 12 that is narrower than the sensor unit 10 and the drive substrate 11 is provided between the sensor unit 10 and the drive substrate 11. The sensor unit 10, the drive substrate 11 and the connection portion 12 are integrally formed. In other words, etching processing is performed on a printed circuit board to have the appearance configuration shown in FIG. 2 and FIG. 8, so that the sensor unit 10, the drive substrate 11 and the connection portion 12 can be integrally formed.

According to this embodiment, the connection portion 12 having the width dimension T3 that is sufficiently narrower than the width dimensions T1 and T2 of the sensor unit 10 and the drive substrate 11 is disposed between the sensor unit 10 and the drive substrate 11, so that the heat source in the sensor unit 10 and the heat source in the drive substrate 11 can be separated from each other. Thus, the heat generated in the drive substrate 11 does not easily reach the sensor unit 10. As a result, good sensor responsiveness can be maintained.

Furthermore, according to this embodiment, the connection portion 12 has a slit 12a therethrough as shown in FIG. 1 to FIG. 3 and FIG. 8. The slit 12a has a shape extending in the Y direction. Continuously with the slit 12a, the connection portion 12 has a small slit 12b extending in the X direction to the sensor unit 10 side. In other words, the connection portion 12 has a substantial T-shaped slit. According to this embodiment, because of the slit of the connection portion 12, the width of the connection portion 12 is further narrowed. Therefore, the heat separation effect can further be increased, and the thermal influence from the drive substrate 11 to the sensor unit 10 can further be weakened. Although the slit 12a may be provided all over the connection portion 12 in the Y direction, the strength of the connection portion 12 is reduced, and thus the connection portion 12 preferably has the slit 12a partially in the Y direction. In this case, forming the slit 12a close to the sensor unit 10 can further weaken the thermal influence from the drive substrate 11 to the sensor unit 10.

The line width of the metallic wiring (wiring pattern), not shown, may be thinner, so that the thermal influence from the drive substrate 11 to the sensor unit 10 can be weakened more effectively. Note that the metallic wiring may have a width of approximately several tens µm to several hundreds µm although the width is not limited thereto.

Since the printed circuit board applied to the unit body 2 has a comparatively high thermal conductivity, the heat sources in the sensor unit 10 and the drive substrate 11 are separated by connecting the drive substrate 11 and the sensor unit 10 through the connection portion 12 having a narrow width and, as described above, further by the slit 12a and so on of the connection portion 12, as shown in FIG. 1 to FIG. 3 and FIG. 8. Thus, the thermal influence from the drive substrate 11 to the sensor unit 10 can be weakened, and the sensor responsiveness can be improved.

<LED Substrate 5>

As shown in FIG. 1 to FIG. 3, a plurality of light emitting devices (LEDs) 25 are provided on a surface of the light emission substrate (LED substrate) 5. Note that the number of the LEDs 25 and the arrangement of the LEDs 25 are not limited. Each of the LEDs 25 is a light emitting device that performs upward (Z1 direction) plane emission. Note that a light emitting device other than an LED can be applied although the LEDs 25 are given as an example of the light emitting device according to this embodiment.

As shown in FIG. 2, according to this embodiment, the LED substrate 5 and the drive substrate 11 are detachably arranged. In other words, according to this embodiment, the LED substrate 5 can be detached from the drive substrate 11 for use, without limiting to the use of the LED substrate 5 attached to the drive substrate 11.

Figure 7:
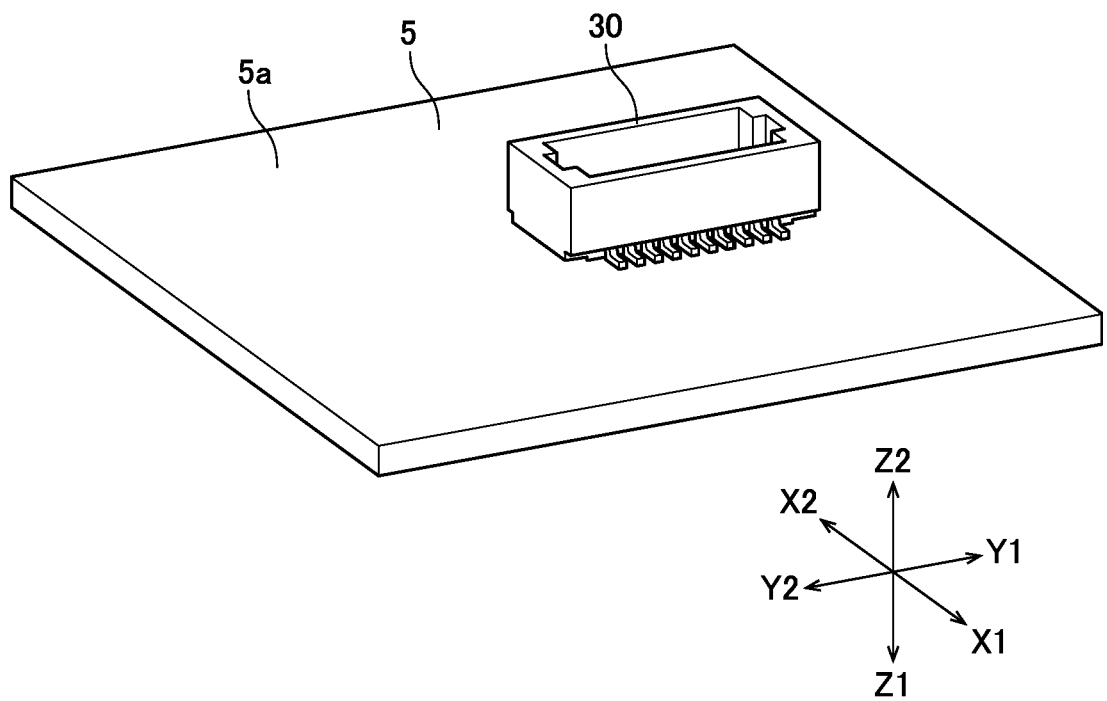
FIG. 7 is a perspective view of an LED substrate of the embodiment viewed from a rear side thereof.

FIG. 7 shows a back surface of the LED substrate 5. As shown in FIG. 7, a substrate-to-substrate connector 30 is provided on a back surface 5a of the LED substrate 5. The substrate-to-substrate connector 20 arranged on the drive substrate 11 is a male connector, and the substrate-to-substrate connector 30 provided on the LED substrate 5 is a female connector. The arrangement of the substrate-to-substrate connectors 20 and 30 may be reversed. These substrate-to-substrate connectors 20 and 30 are connected so that the LED substrate 5 can be mounted on the surface of the drive substrate 11. In this case, the LED substrate 5 and the drive substrate 11 are electrically connected through the substrate-to-substrate connectors 20 and 30. In this way, the substrate-to-substrate connectors 20 and 30 provided on the LED substrate 5 and the drive substrate 11 enable the detachable attachment between the substrates.

As shown in FIG. 1 to FIG. 3, the size of the appearance configuration of the LED substrate 5 is substantially equal to the size of the appearance configuration of the drive substrate 11. Thus, by attaching the LED substrate 5 onto the drive substrate 11, the surface of the drive substrate 11 is covered by the LED substrate 5. Furthermore, as shown in FIG. 1 and FIG. 3, when the LED substrate 5 is attached to the drive substrate 11, the connection portion 12 and the sensor unit 10 of the unit body 2 position externally to the LED substrate 5. Therefore, as shown in FIG. 1 and FIG. 4, the sensor elements 3 and 4 mounted in the sensor unit 10 are disposed away in the Y1 direction from the LED substrate 5.

When the LED substrate 5 is attached to the drive substrate 11 through the substrate-to-substrate connectors 20 and 30, the LEDs 25 on the LED substrate 5 are electrically connected to the drive control circuit on the drive substrate 11. Thus, based on a wind speed measurement by the sensor elements 3 and 4, the LEDs 25 provided on the LED substrate 5 can be caused to emit light. On the other hand, when the LED substrate 5 is detached from the drive substrate 11 for use, the LED 24 provided on the drive substrate 11 can be caused to emit light.

<Case 6>

The case 6 is, for example, a resin compact. The case 6 may be colored or be transparent or semitransparent.

As shown in FIG. 1 to FIG. 3 and FIG. 10, the unit body 2 is accommodated in the case 6. The case 6 is subdivided into accommodating sections that accommodate the sensor unit 10, the drive substrate 11 and the connection portion 12.

As shown in FIG. 2, the case 6 has a first accommodating section 41 that accommodates the sensor unit 10. The first accommodating section 41 has a concave shape elongated in the X direction based on the shape of the sensor unit 10. As shown in FIG. 2 and FIG. 4, the first accommodating section 41 is surrounded by a wall 41b having a height lower than a height of a wall 45 of a third accommodating section 43, which is described below.

The case 6 has a second accommodating section 42 that communicates with the first accommodating section 41 and accommodates the connection portion 12. The second accommodating section 42 has a concave shape having a narrow width based on the width dimension T3 of the connection portion 12. The second accommodating section 42 has a wall 42b having a height equal to the height of the wall 41b of the first accommodating section 41.

According to this embodiment, the second accommodating section 42 does not have a slit at the same position as those of the slits 12a and 12b of the connection portion 12. This is because, if the second accommodating section 42 has a slit, the strength of the second accommodating section 42 is reduced. Also, even if the second accommodating section 42 does not have a slit, the slits 12a and 12b of the connection portion 12 can sufficiently weaken the thermal influence on the sensor unit 10.

The case 6 further has the third accommodating section 43 that communicates with the second accommodating section 42 and accommodates the drive substrate 11.

The third accommodating section 43 has a rectangular concave shape based on the shape of the drive substrate 11. As shown in FIG. 2 and FIG. 4, the third accommodating section 43 is surrounded by the wall 45 that is higher than the walls 41b and 42b of the first accommodating section 41 and the second accommodating section 42.

As shown in FIG. 2 and FIG. 10, the first accommodating section 41 has a first bottom surface 41a having a bottom height equal to that of a third bottom surface 43a of the third accommodating section 43. On the other hand, the second accommodating section 42 has a second bottom surface 42a that projects toward the Z1 direction more than the first bottom surface 41a and the third bottom surface 43a. Thus, the second bottom surface 42a is at a higher position than those of the first bottom surface 41a and the third bottom surface 43a.

As shown in FIG. 2, the third accommodating section 43 has a cylindrical annular ring 44 therethrough at the same position as that of the through-hole 11a of the drive substrate 11. Therefore, the fixing member 26 is inserted through the annular ring 44 of the case 6 and the through-hole 11a of the drive substrate 11, so that the case 6 and the drive substrate 11 can be immovably supported. The annular ring 44 has a surface height equal to the height of the second bottom surface 42a.

As shown in FIG. 2, the wall 45 of the third accommodating section 43 has a side wall 45a on the X2 side having a cutout 45b. At the position of the cutout 45b, the side wall 45a has an equal height to those of the walls 41b and 42b of the first accommodating section 41 and the second accommodating section 42. Thus, when the unit body 2 is attached to the case 6, the opening 21a of the power supply connection connector 21 can be exposed to outside from the cutout 45b as shown in FIG. 1 and FIG. 4, for example.

As shown in FIG. 2 and FIG. 6, the wall 45 of the third accommodating section 43 has a rear wall 45c on the Y2 side having two cutouts 45d and 45e. When the unit body 2 is attached to the case 6, the opening 22a of the upper side connection connector 22 is exposed to outside from the position of the cutout 45d, as shown in FIG. 6. Also, as shown in FIG. 6, the opening 23a of the lower side connection connector 23 is exposed to outside from the position of the cutout 45e. Furthermore, as shown in FIG. 6, a strut 45f positioned between the cutouts 45d and 45e is provided a little closely to the upper side connection connector 22. Thus, a communication cable inserted into the upper side connection connector 22 can be caught by the strut 45f and cannot easily come off.

As shown in FIG. 2, for example, the wall 45 of the third accommodating section 43 has a front wall 45g on the Y1 side having a cutout 45h that extends to the position of the second bottom surface 42a of the second accommodating section 42. Through this cutout 45h, the second accommodating section 42 and the third accommodating section 43 communicate with each other. When the unit body 2 is accommodated in the case 6, the connection portion 12 and the drive substrate 11 can be accommodated in the second accommodating section 42 and the third accommodating section 43, respectively, through the cutout 45h.

As shown in FIG. 2 and FIG. 10, a support 48 having a surface height equal to that of the second bottom surface 42a projects from the third bottom surface 43a of the third accommodating section 43. A plurality of the supports 48 may be provided. For example, a support may also be provided at a corner of the third accommodating section 43 facing the support 48 in the Y1 direction.

As shown in FIG. 1 to FIG. 3 and FIG. 8, an external fixing portion 49 for fixing the flow rate sensor device 1 of this embodiment to an apparatus, not shown, is provided at a rear end of the case 6. The external fixing portion 49 has a through-hole 49a. Through the through-hole 49a, the flow rate sensor device 1 of this embodiment can be immovably supported to, for example, an apparatus. Through the external fixing portion 49, heat within the flow rate sensor device 1 can be dissipated to outside.

According to this embodiment, as shown in FIG. 1 to FIG. 3, the external fixing portion 49 is disposed on the rear end side away from the sensor unit 10 in the Y2 direction. Thus, the thermal influence on the sensor unit 10 upon heat dissipation through the external fixing portion 49 can be small.

As shown in FIG. 2, FIG. 3 and FIG. 4, for example, beams 50 that form a periphery connecting between the wall 41b of the first accommodating section 41 and the side wall 45a of the third accommodating section 43 are provided. The beams 50 have a height equal to the height of the wall 41b of the first accommodating section 41. In addition, as shown in FIG. 2, spaces 51 enclosed by the beams 50, the wall 41b of the first accommodating section 41, the wall 42b of the second accommodating section 42, and the front wall 45g of the third accommodating section 43 are provided.

According to this embodiment, as shown in FIG. 8 and FIG. 10, the sensor unit 10, the drive substrate 11 and the connection portion 12 are accommodated in the accommodating sections 41, 42, and 43 of the case 6. In this case, as shown in FIG. 10, the sensor unit 10 is supported away in the upper direction (Z1 direction) from the first bottom surface 41a of the first accommodating section 41. In this way, a space is provided between the sensor unit 10 and the first bottom surface 41a, so that the heat generated by the sensor unit 10 can be separated to the space side and the air side above the sensor unit 10, and the heat can be mainly dissipated to the air side effectively. Therefore, the thermal influence on the sensor unit 10 can be small, and good sensor responsiveness can be maintained.

According to this embodiment, as shown in FIG. 10, the connection portion 12 can be in contact with the second bottom surface 42a. Thus, the sensor unit 10 can be separated from the first bottom surface 41a by a predetermined distance. Also, the connection portion 12 positioned at the root of the sensor unit 10 is contact-supported by the second accommodating section 42 so that the sensor unit 10 can be maintained to float from the first bottom surface 41a even when, for example, an impact is applied to the flow rate sensor device 1.

As shown in FIG. 10, according to this embodiment, the drive substrate 11 is also separated in the upper direction (Z1 direction) from the third bottom surface 43a. Note that the support 48 is provided between the third bottom surface 43a and the drive substrate 11, and the drive substrate 11 is in contact with the support 48. The annular ring 44 shown in FIG. 2 also has a height equal to that of the support 48, and the drive substrate 11 is in contact with the annular ring 44. Thus, the drive substrate 11 is supported by the support 48 and the annular ring 44 within the third accommodating section 43. According to this embodiment, as shown in FIG. 10, a space can be provided between the drive substrate 11 and the third bottom surface 43a, so that heat generated in the drive substrate 11 can be separated from the outside.

<Sensor Elements 3 and 4>

The sensor elements 3 and 4 are described. For example, the sensor element 3 includes a resistance element 53 for flow rate detection as a thermo-sensitive resistance element. The sensor element 4 includes a resistance element 54 for temperature compensation as a thermo-sensitive resistance element.

Figure 12:
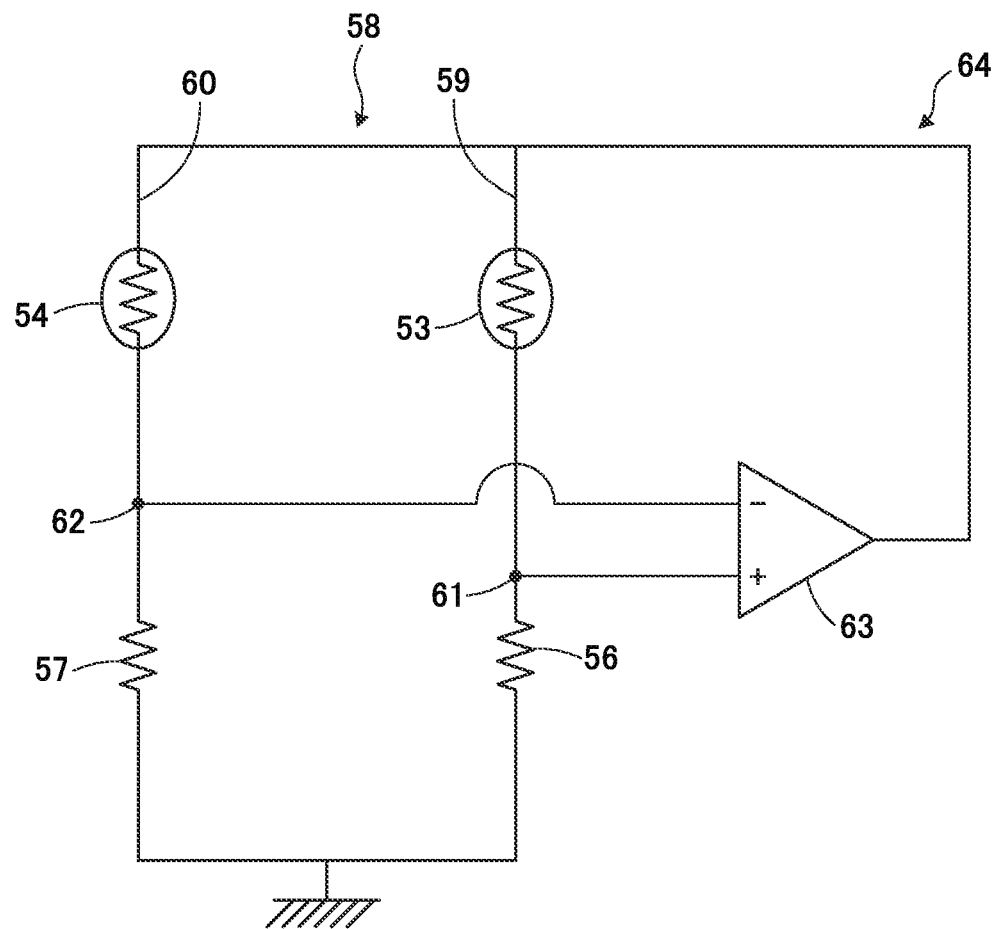
FIG. 12 is a circuit diagram (one example) of the flow rate sensor device of the embodiment.

The resistance element 53 for flow rate detection and the resistance element 54 for temperature compensation are included in a circuit shown in FIG. 12. As shown in FIG. 12, a bridge circuit 58 includes the resistance element 53 for flow rate detection, the resistance element 54 for temperature compensation and resistors 56 and 57. As shown in FIG. 12, a first series circuit 59 includes the resistance element 53 for flow rate detection and the resistor 56, and a second series circuit 60 includes the resistance element 54 for temperature compensation and the resistor 57. The first series circuit 59 and the second series circuit 60 are connected in parallel to construct the bridge circuit 58.

As shown in FIG. 12, each of an output portion 61 of the first series circuit 59 and an output portion 62 of the second series circuit 60 is connected to a differential amplifier 63. A feedback circuit 64 including the differential amplifier 63 is connected to the bridge circuit 58. The feedback circuit 64 includes a transistor (not shown) and so on.

The resistors 56 and 57 have a lower temperature coefficient of resistance (TCR) than the resistance element 53 for flow rate detection and the resistance element 54 for temperature compensation. The resistance element 53 for flow rate detection has a predetermined resistance value Rs1 when, for example, it is controlled to be heated to have a temperature increased from a predetermined ambient temperature by a predetermined value, and the resistance element 54 for temperature compensation is controlled to have a predetermined resistance value Rs2 at the ambient temperature, for example. Note that the resistance value Rs1 is lower than the resistance value Rs2. The resistor 56 included in the first series circuit 59 along with the resistance element 53 for flow rate detection is, for example, a fixed resistor having a resistance value R1 that is similar to the resistance value Rs1 of the resistance element 53 for flow rate detection. The resistor 57 included in the second series circuit 60 along with the resistance element 54 for temperature compensation is, for example, a fixed resistor having a resistance value R2 that is similar to the resistance value Rs2 of the resistance element 54 for temperature compensation.

When the sensor element 3 is set to a temperature higher than the ambient temperature and it receives wind, the temperature of the resistance element 53 for flow rate detection that is a heating resistor decreases. Thus, the potential of the output portion 61 of the first series circuit 59 to which the resistance element 53 for flow rate detection is connected changes. Therefore, differential output is acquired by the differential amplifier 63. Then, in the feedback circuit 64, based on the differential output, drive voltage is applied to the resistance element 53 for flow rate detection. Then, based on the change in voltage required for heating the resistance element 53 for flow rate detection, conversion into the wind speed can be made and output by a microcomputer (not shown). The microcomputer, resistors, the transistors and so on are disposed on the surface of the drive substrate 11 and are electrically connected to each of the sensor elements 3 and 4 through the lead terminals 16 and 18 and the metallic wiring (not shown) on the surface of the drive substrate 11.

The resistance element 54 for temperature compensation provided in the sensor element 4 detects a temperature of a fluid itself and compensates an influence of a change in temperature of the fluid. Thus, by providing the resistance element 54 for temperature compensation, the influence of a change in temperature of a fluid on the flow rate detection can be reduced so that the flow rate detection can be performed with high precision. As described above, the resistance element 54 for temperature compensation has a resistance sufficiently higher than the resistance element 53 for flow rate detection and has a temperature set around the ambient temperature. Therefore, even when the sensor element 4 receives wind, the potential of the output portion 62 of the second series circuit 60 to which the resistance element 54 for temperature compensation is connected does not change greatly. As a result, handling the potential of the output portion 62 as a reference potential, the differential output based on a change in resistance of the resistance element 53 for flow rate detection can be acquired with high precision.

Note that the circuit configuration shown in FIG. 12 is merely an example, and the circuit configuration is not limited thereto.

In the flow rate sensor device 1 of this embodiment, the measurable range of the direction of wind is not limited, but the measurable range can be changed based on the arranged states of the sensor elements 3 and 4. For example, according to this embodiment, the sensor elements 3 and 4 stand in the Z1 direction such that the wind speed can be detected when wind flows from the front to the rear of the flow rate sensor device 1 (that is, from the Y1 side toward the Y2 direction). Note that the measurable direction of wind is not strictly limited. In other words, even if wind flows diagonally from the Y1 side toward the Y2 direction, the measurement can be performed.

Figure 9:
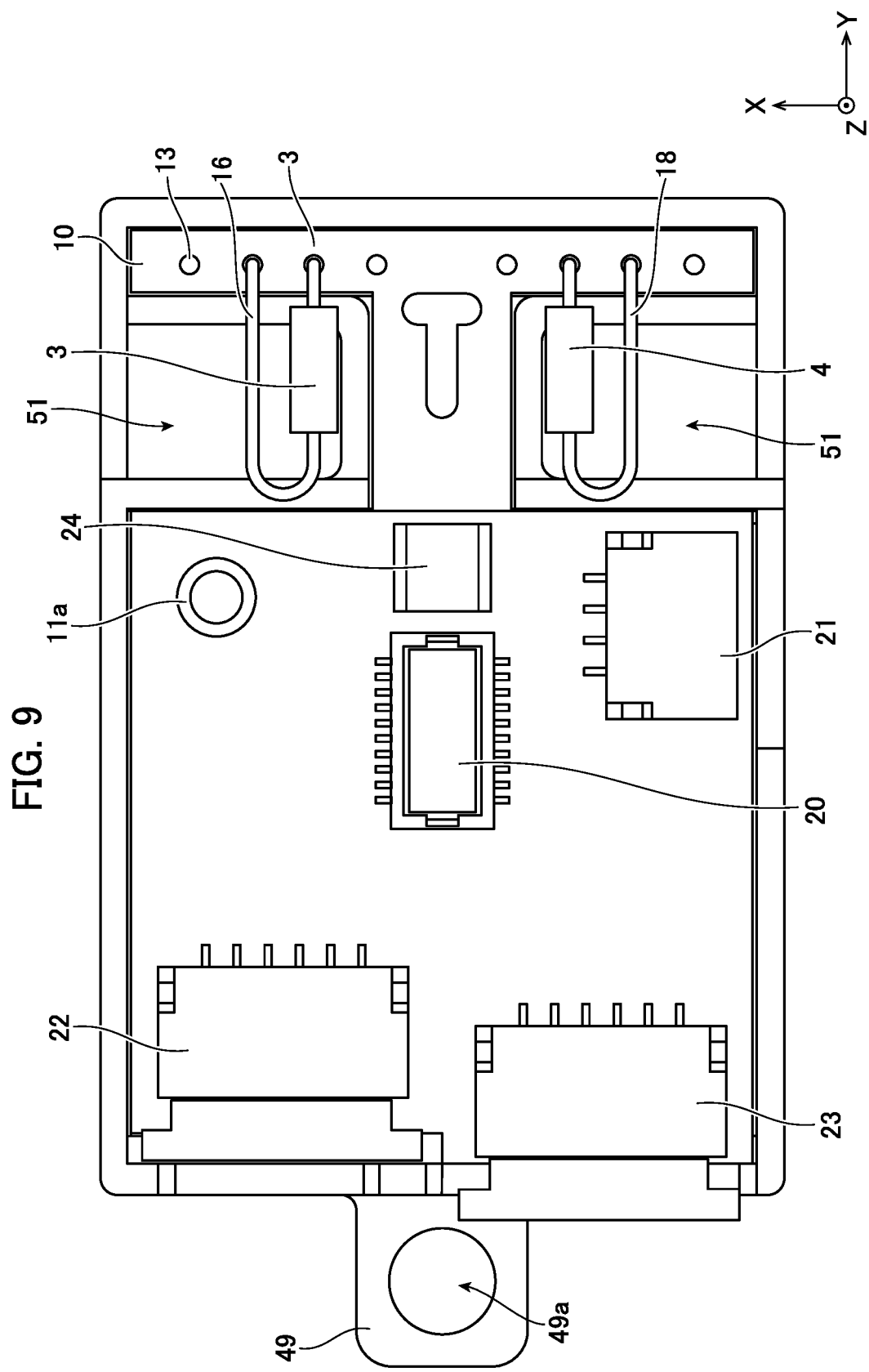
FIG. 9 is a plan view of the flow rate sensor device showing a state that sensor devices are bent from the state in FIG. 8.

For example, as shown in FIG. 9, the standing sensor elements 3 and 4 may be tilted toward the rear, and the sensor elements 3 and 4 may face the spaces 51 positioned in the rear direction of the sensor unit 10. In this case, the sensor elements 3 and 4 can detect wind flowing in the substantial Z direction through the spaces 51. Although the sensor elements 3 and 4 can be tilted to the front on the opposite side of the spaces 51, the sensor elements 3 and 4 protrude to the front. In this case, a mechanism that protects the sensor elements 3 and 4 is required. With the sensor elements 3 and 4 protruding to the front, the flow rate sensor device 1 has a shape elongated in the Y direction. Accordingly, as shown in FIG. 9, the sensor elements 3 and 4 tilted to the rear and facing the spaces 51 enable detection of wind in the Z direction, and the sensor elements 3 and 4 can be properly protected, further contributing to reduction of the size of the flow rate sensor device 1.

<About Effects of Flow Rate Sensor Device 1 of First Embodiment>

(1) The LED substrate 5 and the drive substrate 11 are detachable.

According to this embodiment, the LED substrate 5 and the drive substrate 11 are detachably provided as shown in FIG. 2, for example. Thus, according to this embodiment, for example, as required by a user, the LED substrate 5 can be mounted on the drive substrate 11, or the flow rate sensor device 1 from which the LED substrate 5 is removed can be provided. By mounting the LED substrate 5 in the flow rate sensor device 1, the LEDs 25 can be caused to emit light based on the result of a measurement of a wind speed by the sensor elements 3 and 4.

Particularly, according to this embodiment, the plurality of LEDs 25 are disposed on the LED substrate 5. These LEDs 25 may be caused to emit light in the same manner or may be caused to emit light in different manners. Thus, the flow rate sensor device 1 of this embodiment can be applied to various applications.

The LED substrate 5 can be detached from the drive substrate 11 for use. Reduction of the thickness of the flow rate sensor device 1 can be achieved by the detachment of the LED substrate 5. For example, it is conceivable that the flow rate sensor device 1 without the LED substrate 5 is applicable to an analysis device rather than an illumination device.

(2) The separation effect of the thermal influence on the sensor unit 10 can be increased.

According to this embodiment, the sensor unit 10 and the drive substrate 11 are connected by the connection portion 12 that is thin in the width dimension. The width dimension T3 of the connection portion 12 is sufficiently thinner than the width dimensions T1 and T2 of both of the sensor unit 10 and the drive substrate 11.

Thus, the heat source in the drive substrate 11 and the heat source in the sensor unit 10 can be separated by the connection portion 12 that is thin in width. Therefore, the thermal influence from the drive substrate 11 to the sensor unit 10 can be suppressed, and good sensor responsiveness can be maintained.

According to this embodiment, as shown in FIG. 8, for example, the connection portion 12 has the slits 12*a* and 12*b*. Thus, the width of the connection portion 12 is thinner at the positions where the slits 12*a* and 12*b* are provided. Therefore, the thermal influence from the drive substrate 11 to the sensor unit 10 can be more effectively weakened. Particularly, the effect is increased if the slits 12*a* and 12*b* are close to the sensor unit 10. In this way, the slits 12*a* and 12*b* of the connection portion 12 can attempt further improvement of the sensor responsiveness.

(3) The thermal influence on the sensor unit 10 can be weakened by the space.

According to this embodiment, as shown in FIG. 10, the sensor unit 10 is supported to float upward (Z1 direction) from the bottom surface (first bottom surface 41*a*) of the case 6, and the sensor unit 10 is separated from the bottom surface. Thus, heat generated in the sensor unit 10 can be separated into the space side between the sensor unit 10 and the first bottom surface 41*a* and the air side above the sensor unit 10, so that the heat can mainly be dissipated to the air side effectively. Therefore, the thermal influence on the sensor unit 10 can be small, and good sensor responsiveness can be maintained.

According to this embodiment, as shown in FIG. 2 and FIG. 10, the second bottom surface 42*a* of the narrow second accommodating section 42 that accommodates the connection portion 12 projects more and is positioned higher than the first bottom surface 41*a* of the first accommodating section 41 that accommodates the sensor unit 10 and the third bottom surface 43*a* of the third accommodating section 43 that accommodates the drive substrate 11. Thus, as shown in FIG. 10, when the unit body 2 is accommodated in the case 6, the connection portion 12 is in contact with the second bottom surface 42*a* while the sensor unit 10 can be supported away in the upper direction (Z1 direction) from the first bottom surface 41*a*. Also, in this case, the drive substrate 11 can be supported away in the upper direction (Z1 direction) from the third bottom surface 43*a*. Thus, the heat generated in the drive substrate 11 is separated by the space between the drive substrate 11 and the third bottom surface 43*a*, and the thermal influence on the sensor unit 10 can be weakened. However, since the drive substrate 11 has the largest area within the unit body 2, a large load is imposed on the connection portion 12 when only the connection portion 12 is in contact with the second bottom surface 42*a* to support the unit body 2 within the case 6. Also, the impact resistance of the flow rate sensor device 1 is weakened. Therefore, a structure is desirably adopted which has the support 48 having an equal surface height to that of the second bottom surface 42*a* also between the drive substrate 11 and the third bottom surface 43*a* to support the drive substrate 11.

(4) A wide choice of options for the arrangement of the sensor elements 3 and 4 is provided.

According to this embodiment, as shown in FIG. 1, for example, the sensor unit 10 is provided with the plurality of terminal holes 13. The number of these terminal holes 13 is higher than the number of terminals required for connecting the sensor elements 3 and 4. Thus, the sensor elements 3 and 4 can be arranged at a plurality of positions, and a wide choice of options for the arrangement can be provided. For example, although the sensor elements 3 and 4 are arranged at the closest positions in the X direction in FIG. 1, for example, the sensor elements 3 and 4 can be arranged away from each other in the X direction. The sensor elements 3 and 4 can be arranged to face each other with an interval therebetween in the Z direction. Thus, based on, for example, a user's need, the range for measuring wind can be changed, and the measurement sensitivity can be adjusted.

<Flow Rate Sensor Device 100 of Second Embodiment>

Figure 13:
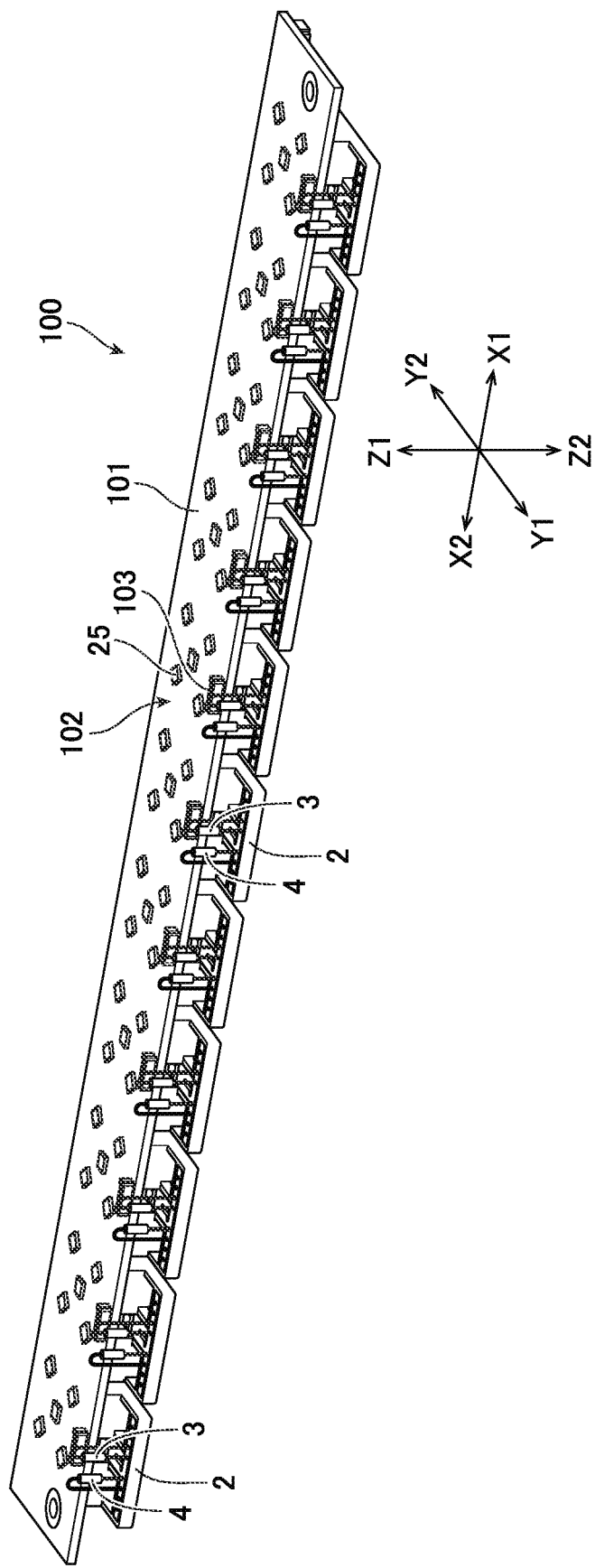
FIG. 13 is a perspective view of a multiple-type flow rate sensor device according to a second embodiment.
Figure 14:
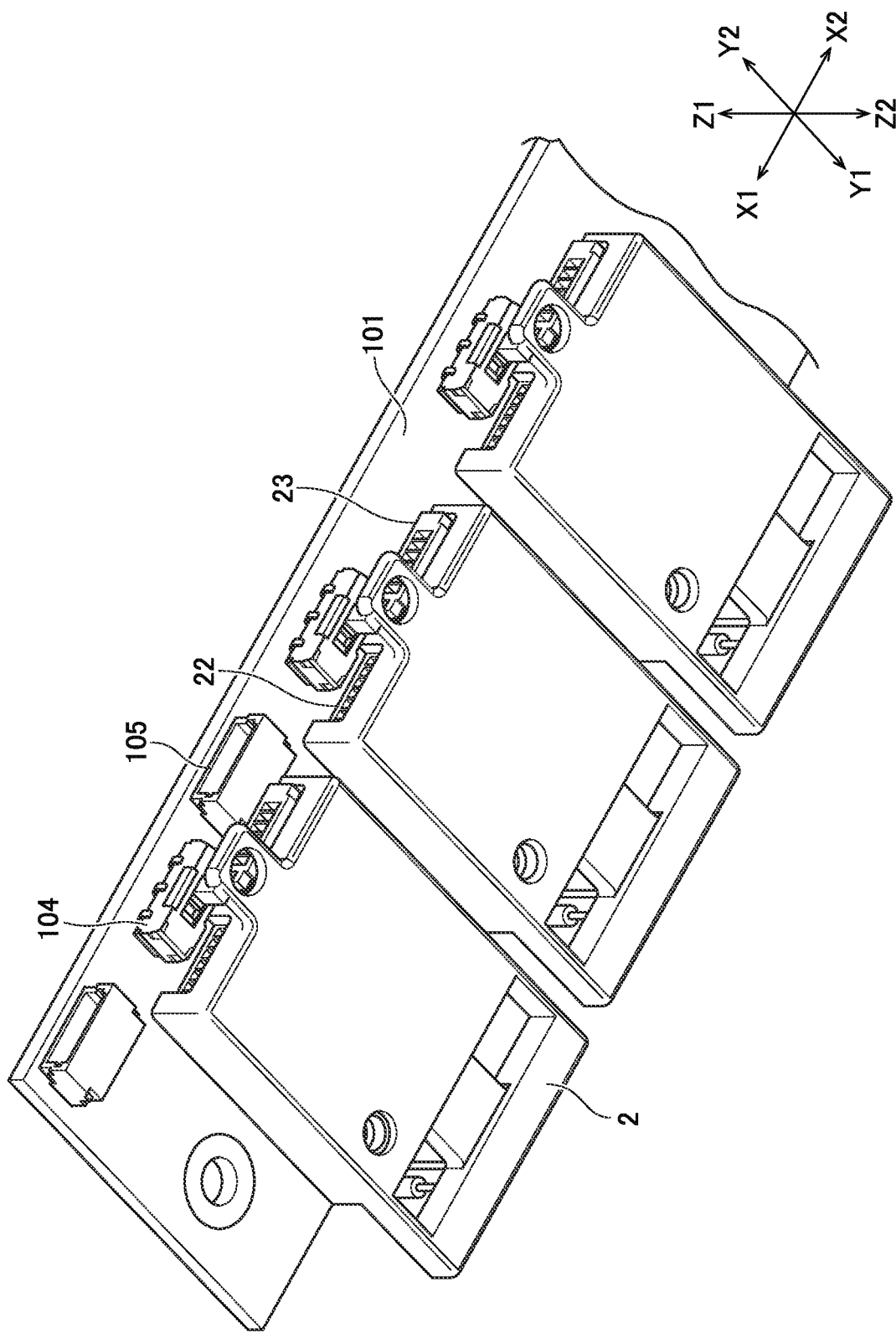
FIG. 14 is a partially enlarged perspective view of the multiple-type flow rate sensor device shown in FIG. 13 viewed from a rear side thereof.

FIG. 13 is a perspective view of a multiple-type flow rate sensor device according to a second embodiment. FIG. 14 is a partially enlarged perspective view of the multiple-type flow rate sensor device shown in FIG. 13 viewed from the rear side.

According to the second embodiment shown in FIG. 13, a multiple-type flow rate sensor device 100 is provided which includes a multi-point LED substrate 101 and a plurality of unit bodies 2 and in which the unit bodies 2 are disposed in parallel on the multi-point LED substrate 101.

The multiple-type flow rate sensor device 100 shown in FIG. 13 and FIG. 14 is acquired by multiple connection of the flow rate sensor devices 1 shown in FIG. 1. Therefore, as to the details of the structures of the members, refer to the description above. Differences from FIG. 1 are mainly described below.

As shown in FIG. 13, the multi-point LED substrate 101 integrally has a plurality of the LED substrates 5 shown in FIG. 1 in the X direction. Although the multi-point LED substrate 101 has an elongated shape that is long in the X direction in FIG. 13, the multi-point LED substrate 101 may have, for example, a shape that extends in the X direction and bends partway. Alternatively, the multi-point LED substrate 101 may have a rectangular ring shape, a circular ring shape or the like.

On the multi-point LED substrate 101 shown in FIG. 13, one LED 103 that emits light toward the front (Y1 direction) shown in FIG. 13 is disposed along with an LED group 102 including a set of five LEDs 25 that emit light upward (Z1 direction).

Like FIG. 1, for example, the plurality of the unit bodies 2 provided in parallel on the multi-point LED substrate 101 as shown in FIG. 13 are detachably attached to the multi-point LED substrate 101. As shown in FIG. 13, in the front direction (Y1 direction) of the multi-point LED substrate 101, a plurality of the sensor elements 3 and 4 mounted in front of each of the unit bodies 2 are provided in parallel in the X direction.

With the multiple-type flow rate sensor device 100 shown in FIG. 13, the range of measurement of wind can be extended in the X direction. By changing the arrangement, the range of measurement of wind can be extended in the Y direction or the Z direction, and visualization of a three-dimensional space can be realized. The multiple-type flow rate sensor device 100 described herein can detect, for example, wind entering a radiator, airflow of an air conditioner, airflow of a dust collector, air flow of a fan, or the like. Based on the result of the measurement of wind, for example, many LEDs 25 disposed in a row in the X direction on the multi-point LED substrate 101 can be caused to sequentially emit light. Note that how they emit light can be properly set. Thus, visualization of airflow can be realized.

As shown in FIG. 14, a plurality of signal line selection switches 104 are disposed on a back surface side of the multi-point LED substrate 101. The signal line selection switches 104 are provided at rear end positions of the places where the unit bodies 2 are attached.

According to this embodiment, each of the unit bodies 2 has a connector to connect with the multi-point LED substrate 101, and a signal for connecting to the adjacent unit body 2 is also supplied to the connector. Thus, the unit bodies 2 that are adjacent to each other are electrically connected through the multi-point LED substrate 101 so that signals can be transmitted and received. Therefore, according to this embodiment, the connectors 22 and 23 provided in each of the unit bodies 2 are not used, and insertion of a power cable into a power supply connection connector 105 disposed on the back surface of the multi-point LED substrate 101 is required for use.

Here, the intervals between the plurality of unit bodies 2 connected to the multi-point LED substrate 101 correspond to a density of wind speed measurement. As the number of the connected unit bodies 2 increases, the density of wind speed measurement increases. FIG. 13 shows a state that all of the unit bodies 2 are connected, which produces the highest density of wind speed measurement. Accordingly, in order to reduce the density of wind speed measurement, the unit body 2 is thinned out from the state in FIG. 13. In this case, the signal line selection switch disposed at the position where the thinned out unit body 2 is installed is turned on. When the signal line selection switch is turned on, the wiring pattern on the multi-point LED substrate 101 at the position where the unit body 2 is not installed can be short-circuited with both adjacent wiring patterns. As a result, the wiring pattern on the multi-point LED substrate 101 at the position where the unit body 2 is not installed can be electrically connected to both adjacent unit bodies 2. Note that the signal line selection switches 104 at positions where the unit bodies 2 are disposed are turned off.

In this way, in the multiple-type flow rate sensor device 100 shown in FIG. 13 and FIG. 14, the density of wind speed measurement can be changed easily and properly.

<Flow Rate Sensor Device 200 of Third Embodiment>

Figure 15:
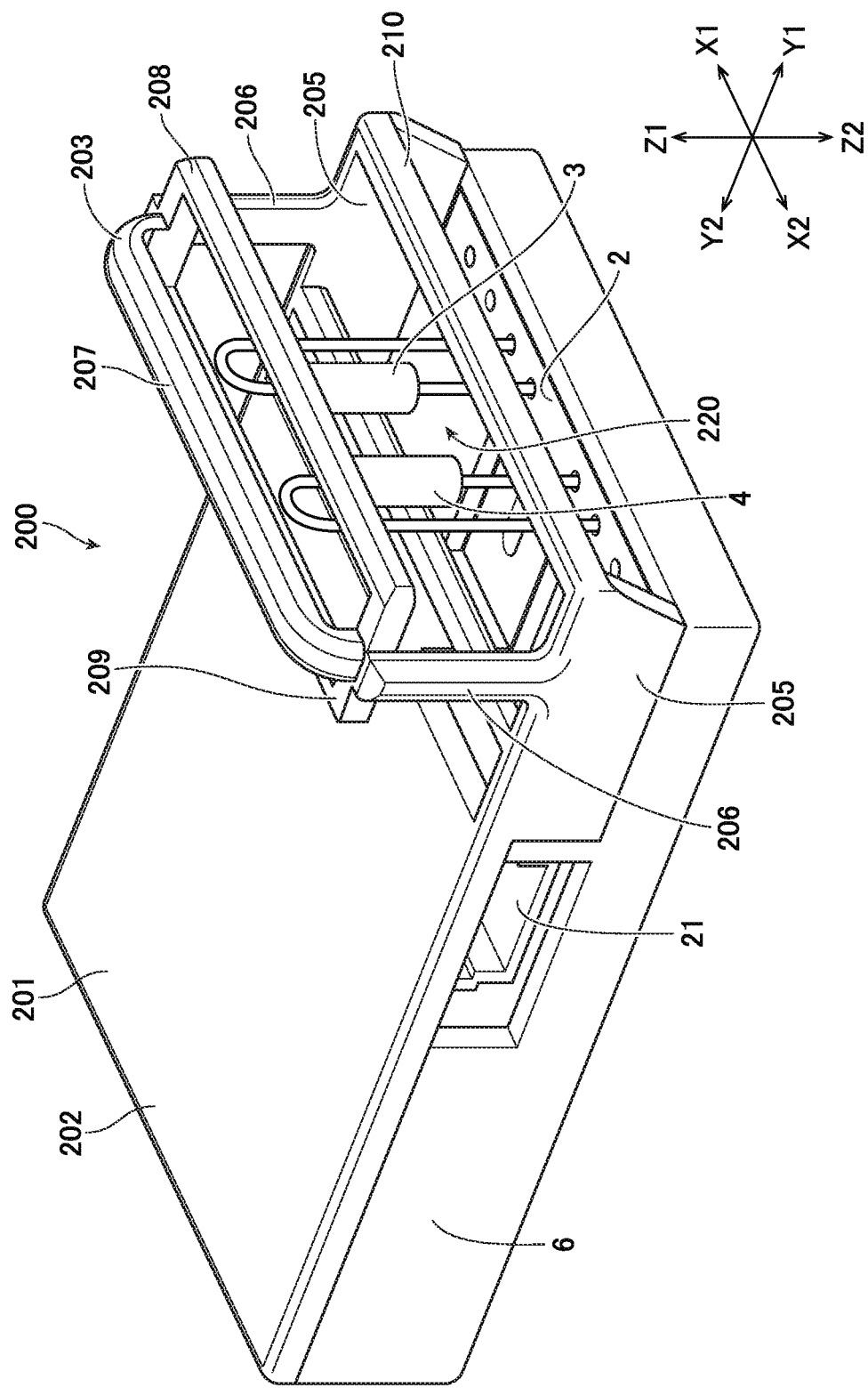
FIG. 15 is a perspective view of a flow rate sensor device according to a third embodiment.
Figure 16:
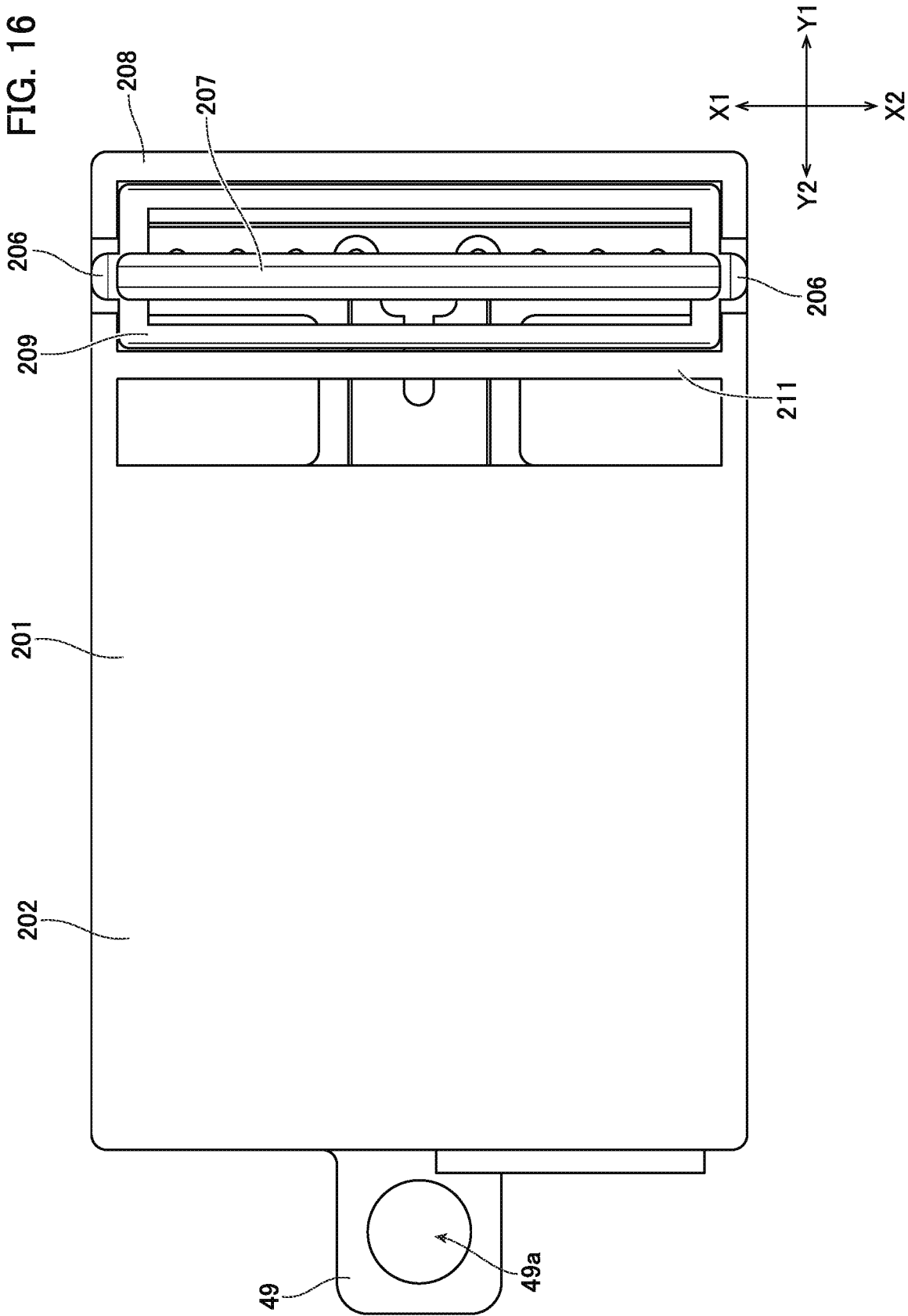
FIG. 16 is a plan view of the flow rate sensor device according to the third embodiment.
Figure 17:
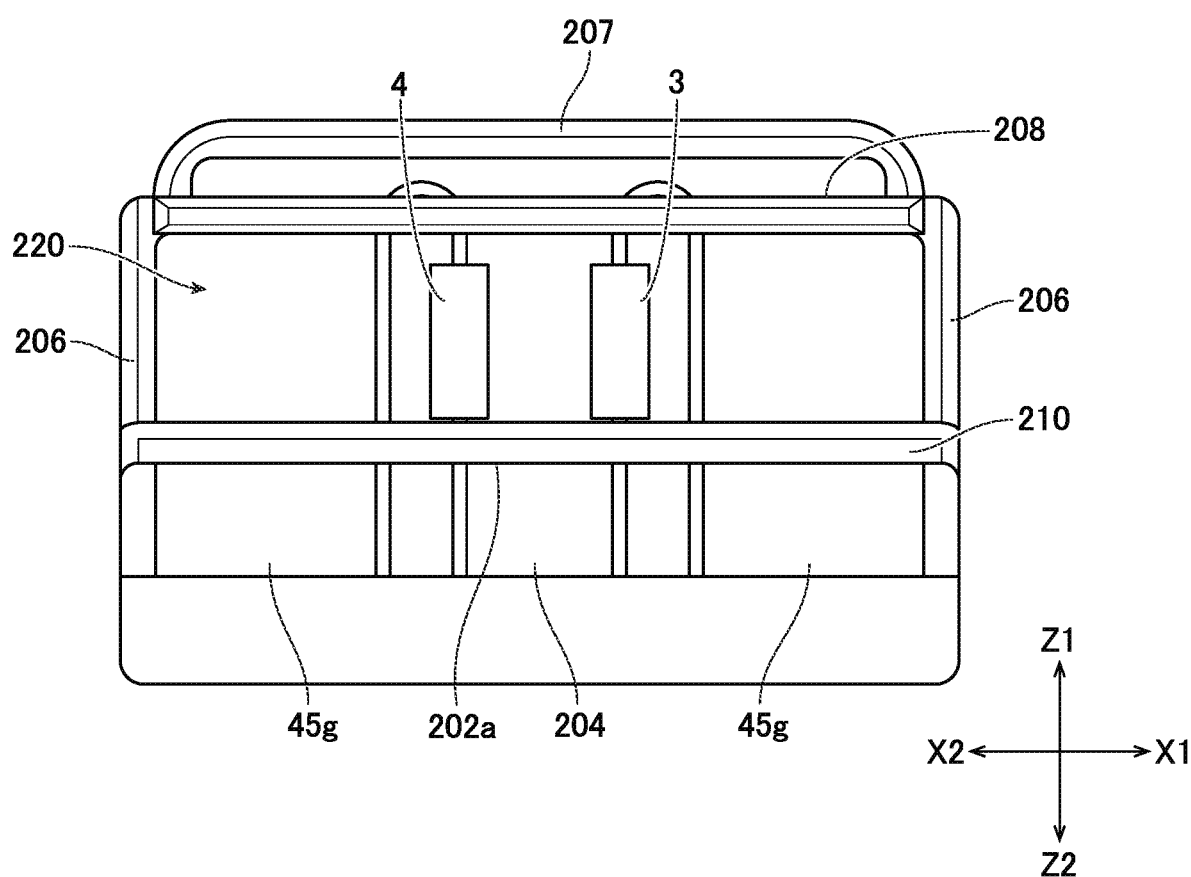
FIG. 17 is a front view of the flow rate sensor device according to the third embodiment.
Figure 18:
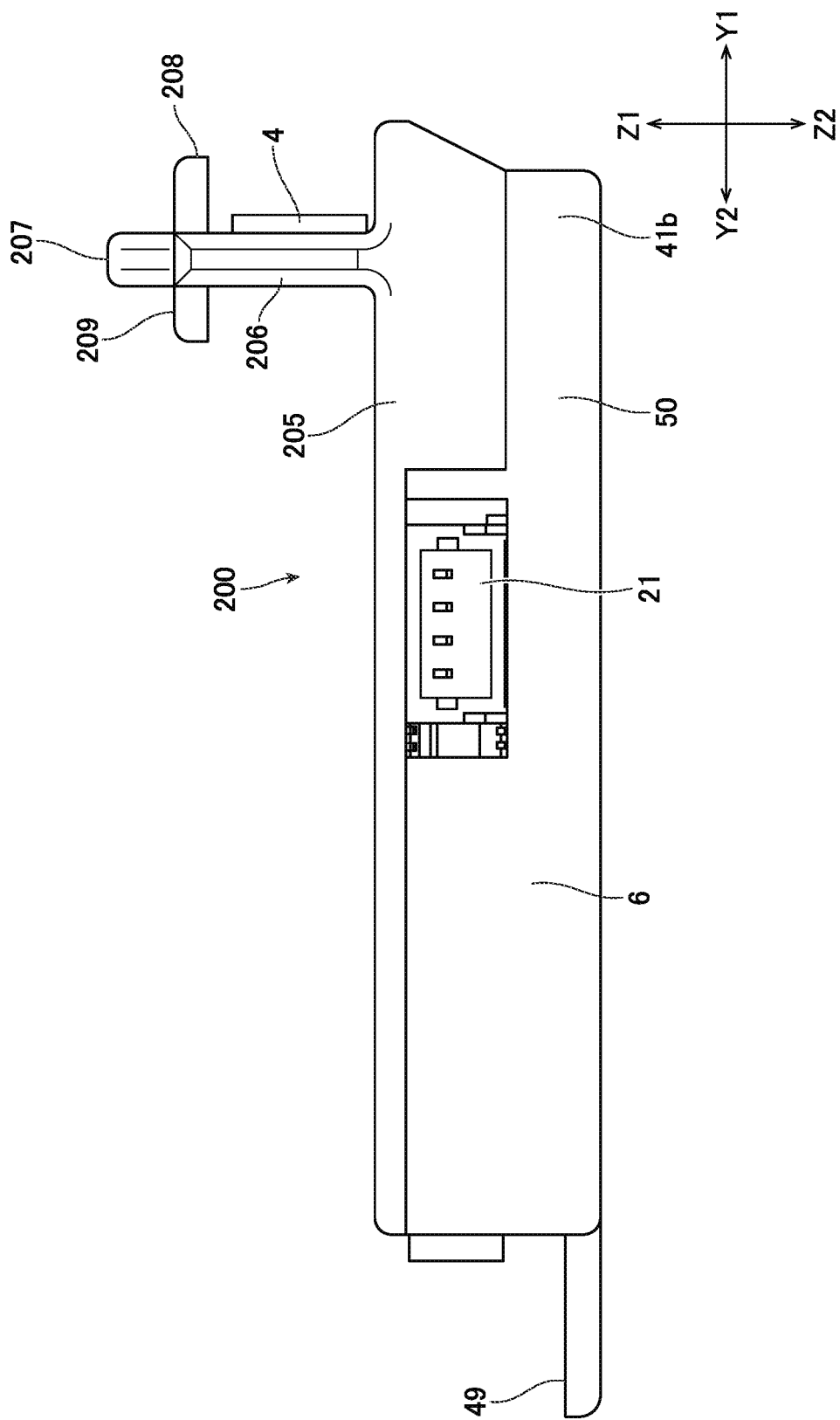
FIG. 18 is a side view of the flow rate sensor device according to the third embodiment.
Figure 19:
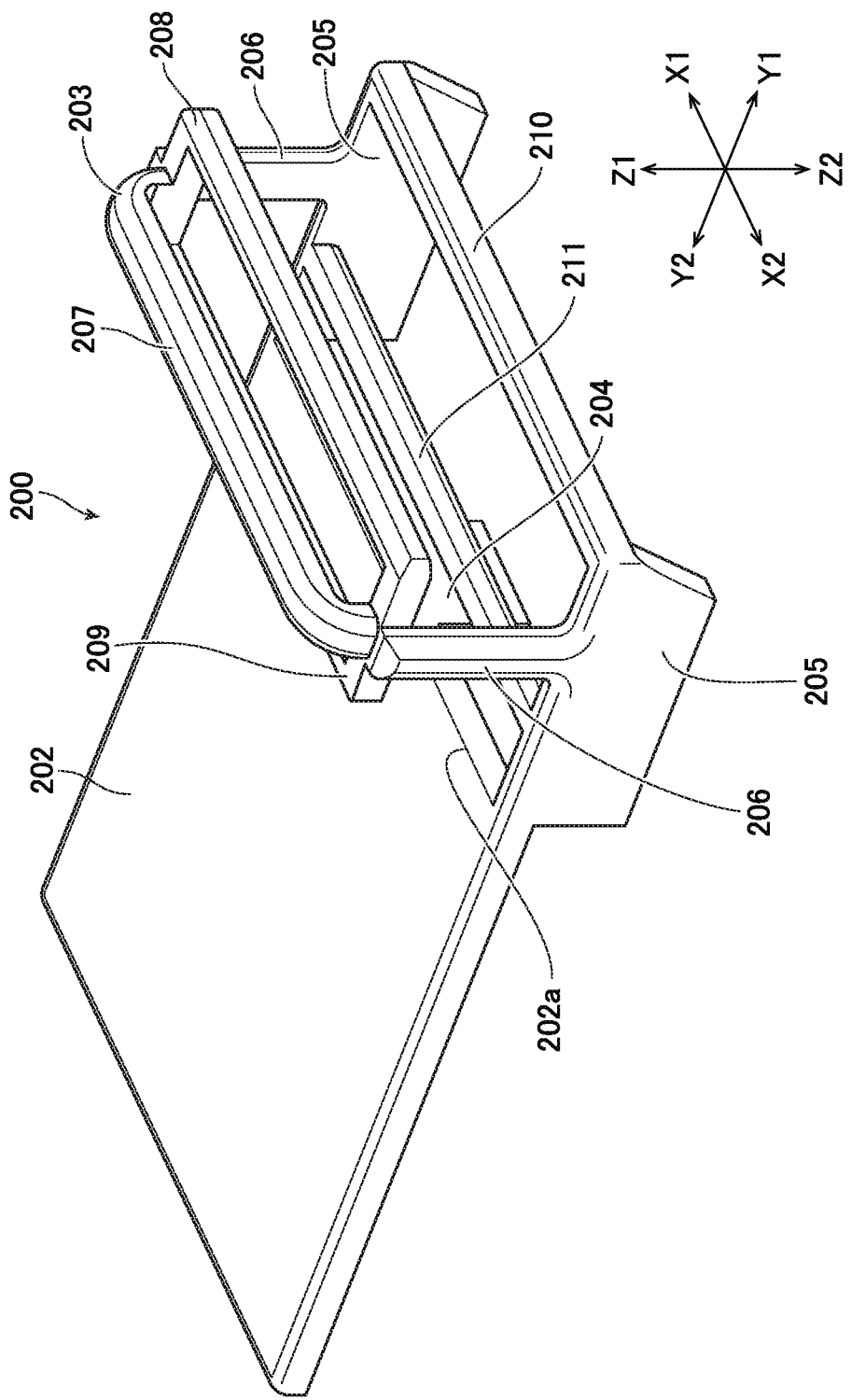
FIG. 19 is a perspective view of a translucent cover according to the embodiment.

FIG. 15 is a perspective view of a flow rate sensor device according to a third embodiment. FIG. 16 is a plan view of the flow rate sensor device according to the third embodiment. FIG. 17 is a front view of the flow rate sensor device according to the third embodiment. FIG. 18 is a side view of the flow rate sensor device according to the third embodiment. FIG. 19 is a perspective view of a translucent cover according to the embodiment.

According to the third embodiment shown in FIG. 15, although the unit body 2 and the case 6 shown in FIG. 2 are used, the LED substrate 5 is not disposed. According to the third embodiment, the unit body 2 is protected by using a translucent cover 201.

Since the body unit 2 and the case 6 of a flow rate sensor device 200 shown in FIG. 15 are the same as those of the flow rate sensor device 1 of the first embodiment in FIG. 1 and so on, refer to the description above as to details of the structures thereof. The translucent cover 201 that is not used in FIG. 1 is described in detail below.

The translucent cover 201 shown in FIG. 15 is a transparent or semitransparent resin compact, and the material thereof is not particularly limited if the translucent cover 201 has a predetermined optical transparency.

As shown in FIG. 15 and FIG. 19, for example, the translucent cover 201 has a rear end cover 202 that covers an upper part of the drive substrate 11 and a front end cover 203 that protects the sensor elements 3 and 4 mounted in the sensor unit 10.

The rear end cover 202 is flat-shaped and has a size substantially equal to the area enclosed by the wall 45 (refer to FIG. 2) of the third accommodating section 43 of the case 6.

On a back surface of the rear end cover 202, a cylindrical portion (not shown) having a ceiling surface is provided at a position facing the through-hole 11*a* of the drive substrate 11. With the fixing member 26 shown in FIG. 2, the case 6, the unit body 2 and the translucent cover 201 can be immovably supported.

As shown in FIG. 17 and FIG. 19, the rear end cover 202 has a front end portion 202*a* having, at its substantially center, a tongue piece 204 extending in the lower direction (Z2 direction). The tongue piece 204 has a shape that just gets into the cutout 45*h* of the front wall 45*g* of the case 6 in FIG. 2. Therefore, when the unit body 2 is accommodated in the case 6 and is further covered by the translucent cover 201, the tongue piece 204 positions at the cutout 45*h* of the front wall 45*g* of the case 6, as shown in FIG. 17. Thus, the entire periphery of the drive substrate 11 of the unit body 2 accommodated in the case 6 is surrounded by the wall 45 of the case 6 and the rear end cover 202 and tongue piece 204 of the translucent cover 201 and is protected from outside.

The front end cover 203 integrally provided with the rear end cover 202 has side walls 205 that extend downward (Z2 direction) in the front direction of the rear end cover 202 and on both sides in the X direction, as shown in FIG. 15 and FIG. 19. When the translucent cover 201 is placed over the case 6, the side walls 205 are in contact with the beams 50 of the case 6 through an upper end of the wall 41*b* of the first accommodating section 41, as shown in FIG. 18, for example. Thus, as shown in FIG. 15 and FIG. 18, sides of the flow rate sensor device 200 are enclosed except for the part having the power supply connection connector 21.

As shown in FIG. 15 and FIG. 19, for example, the front end cover 203 has supports 206 that extend upward (Z1 direction) from the upper ends of the side walls 205. The supports 206 have upper ends integrally jointed by a ceiling bar 207. Furthermore, as shown in FIG. 15, FIG. 18 and FIG. 19, a front bar 208 that hangs over from the upper end sides of the supports 206 to the front (Y1 direction) and a rear bar 209 that hangs over from the upper end sides of the supports 206 to the rear (Y2 direction) are provided. Note that the ceiling bar 207 is provided at a higher position than the front bar 208 and the rear bar 209.

Furthermore, the front end cover 203 has a front beam 210 that joints the front end sides of the side walls 205 as shown in FIG. 15, FIG. 17 and FIG. 19, and a rear beam 211, shown in FIG. 16 and FIG. 19, for example, located at a rear position (Y2 direction) relative to the support 206 and jointing between the side walls 205. These beams 210 and 211 are provided for maintaining the strength of the front end cover 203 and for preventing a user from accidentally inserting, for example, his or her finger thereinto.

As shown in FIG. 15 and FIG. 17, the front bar 208 and the rear bar 209 are provided at a little higher position than the sensor elements 3 and 4. Thus, a vent 220 that allows wind to pass through to the sensor elements 3 and 4 is provided in the front and rear directions of the sensor elements 3 and 4 where the front end cover 203 does not exist. Therefore, through the vent 220, wind can be caused to properly act on the sensor elements 3 and 4.

Here, the sensor elements 3 and 4 are resistance elements, as already described above, and the temperatures of the sensor elements 3 and 4 increase from several tens degrees up to about 100° C. during their operations. Thus, when a user accidentally touches the sensor element 3 or 4 with his or her finger, there is a risk of, for example, burns. Therefore, in order to prevent fingers from touching the sensor elements 3 and 4, the ceiling bar 207, the front bar 208 and the rear bar 209 are disposed in the upper, front and rear directions of the sensor elements 3 and 4. Thus, the risk that a finger touches the sensor element 3 or 4 can be prevented. Also, in addition to the touch by a finger, contact with the sensor elements 3 and 4 from outside can be prevented so that the sensor elements 3 and 4 can be protected.

Although, according to this embodiment, the translucent cover 201 is directly placed over the unit body 2 without using the LED substrate 5, the LED substrate 5 may be attached to the unit body 2, and an upper part of the LED substrate 5 is covered by the translucent cover 201. In this case, the connection structure between the translucent cover 201 and the case 6 is required to be changed from that in FIG. 19 such that the translucent cover 201 can be attached to the case 6 having the unit body 2 and the LED substrate 5 therein.

Feature parts of the flow rate sensor device of this embodiment are described.

This embodiment is the flow rate sensor device 1 including the sensor elements 3 and 4 that detect a flow rate, wherein the sensor unit 10 on which the sensor elements 3 and 4 are mounted and the drive substrate 11 including the drive control circuit are connected through the connection portion 12 narrower than a width of the drive substrate 11.

Thus, a heat source in the drive substrate 11 and a heat source in the sensor unit 10 can be separated by the connection portion 12 that is thin in width. Therefore, the thermal influence from the drive substrate 11 to the sensor unit 10 can be suppressed. As a result, good sensor responsiveness can be maintained.

According to this embodiment, the sensor unit 10 is preferably provided with the plurality of terminal holes 13 which enable the sensor elements 3 and 4 to be mounted at a plurality of positions. In this way, according to this embodiment, a wide choice of options for arrangement of the sensor elements 3 and 4 can be provided. Thus, based on, for example, a user's need, the range for measuring wind can be changed, and the measurement sensitivity can be adjusted.

According to this embodiment, the sensor unit 10 preferably has a width larger than a width of the connection portion 12. Thus, the heat separation effect can be increased more effectively, and the sensor responsiveness can be improved. Furthermore, an area for mounting a plurality of the sensor elements 3 and 4 can be secured in the sensor unit 10, and, in particular, a structure can be acquired on which the sensor elements 3 and 4 can be mounted at a plurality of positions, as described above.

According to this embodiment, a through-hole is preferably formed in the connection portion. The through-hole has a slit shape (slits 12a and 12b above) though the shape of the through-hole is not limited. Thus, the thermal influence from the drive substrate 11 to the sensor unit 10 can be effectively weakened.

According to this embodiment, the through-hole is preferably formed closely to the sensor unit 10. Thus, the thermal influence from the drive substrate 11 to the sensor unit 10 can be more effectively weakened.

The flow rate sensor device 200 of this embodiment preferably further includes the translucent cover 201 having the vent 220 for the sensor elements 3 and 4 and including a contact preventing structure that prevents contact with the sensor elements 3 and 4 from outside. Thus, through the vent 220 for the sensor elements 3 and 4, wind can be caused to properly act on the sensor elements 3 and 4, and good sensor responsiveness can be acquired. In addition, the contact preventing structure that prevents contact with the sensor elements 3 and 4 from outside is provided. The contact preventing structure corresponds to the ceiling bar 207, front bar 208 and rear bar 209 shown in FIG. 15. Thus, for example, a user can be prevented from directly touching the heated sensor elements 3 and 4 with his or her finger. In addition to the touch by user's finger, contact with the sensor elements 3 and 4 from outside can be prevented so that the sensor elements 3 and 4 can be properly protected.

Having described above that the sensor elements 3 and 4 are wind speed sensors, they may be sensors that can detect a change in flow rate of a gas flow or a liquid such as water in addition to the wind speed.

INDUSTRIAL APPLICABILITY

As described above, the present invention can acquire good sensor responsiveness, can be applied to various applications as indication forms by using flow rate detection and can be applied for analysis and the like.

This application claims benefit of Japanese Patent Laid-Open No. 2018-177993 filed Sep. 21, 2018, the entire of which is incorporated by reference herein.

The invention claimed is:

1. A flow rate sensor device comprising provided with a sensor element that detects a flow rate, the flow rate sensor device comprising:
 a unit body comprising:
  a sensor unit, on which the sensor element is mounted, and
  a drive substrate including a drive control circuit and
 a case that accommodates the unit body,
 wherein the sensor unit and the drive substrate are connected by a connection portion,
 wherein the connection portion has a narrower width than a width of the drive substrate, and
 wherein the case comprises a groove, into which the connection portion is fit-engaged.

2. The flow rate sensor device according to claim 1, wherein the sensor unit is provided with a plurality of terminal holes which enable the sensor element to be mounted at a plurality of positions.

3. The flow rate sensor device according to claim 1, wherein the sensor unit has a width larger than a width of the connection portion.

4. The flow rate sensor device according to claim 1, wherein a through-hole is formed in the connection portion.

5. The flow rate sensor device according to claim 4, wherein the through-hole is formed closely to the sensor unit.

6. The flow rate sensor device according to claim 1, further comprising a translucent cover having a vent for the sensor element and including a contact preventing structure that prevents contact with the sensor element from outside.

* * * * *